United States Patent
Desai et al.

(10) Patent No.: US 9,690,770 B2
(45) Date of Patent: Jun. 27, 2017

(54) ANALYSIS OF DOCUMENTS USING RULES

(75) Inventors: Anish Desai, Castro Valley, CA (US); Lifang Yao, Union City, CA (US); Sharad Bhardwaj, Herndon, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1271 days.

(21) Appl. No.: 13/149,831

(22) Filed: May 31, 2011

(65) Prior Publication Data
US 2012/0311426 A1 Dec. 6, 2012

(51) Int. Cl.
G06F 17/27 (2006.01)
G06F 17/30 (2006.01)

(52) U.S. Cl.
CPC ...... *G06F 17/2705* (2013.01); *G06F 17/3061* (2013.01)

(58) Field of Classification Search
CPC .......................... G06F 17/2705; G06F 17/3061
USPC ................................................. 715/227, 243
See application file for complete search history.

(56) References Cited

U.S. PATENT DOCUMENTS

| | | | |
|---|---|---|---|
| 6,212,494 B1 | 4/2001 | Boguraev | |
| 6,542,635 B1* | 4/2003 | Hu et al. | 382/173 |
| 6,694,053 B1* | 2/2004 | Burns | G06K 9/00469 382/176 |
| 6,850,950 B1 | 2/2005 | Clarke et al. | |
| 6,912,529 B1 | 6/2005 | Kolfman | |
| 6,996,575 B2 | 2/2006 | Cox et al. | |
| 7,058,643 B2 | 6/2006 | Vailaya | |
| 7,065,742 B1* | 6/2006 | Bogdan | G06F 9/4433 715/234 |
| 7,440,967 B2 | 10/2008 | Chidlovskii | |
| 7,536,383 B2 | 5/2009 | Colclasure et al. | |
| 7,792,814 B2 | 9/2010 | Cohen | |
| 2004/0006742 A1* | 1/2004 | Slocombe | 715/513 |
| 2006/0004725 A1* | 1/2006 | Abraido-Fandino | G06F 17/30864 |

(Continued)

OTHER PUBLICATIONS

Adelberg, Brad "NoDoSE-A tool for Semi-Automatically Extracting Structured and Semistructured Data from Text Documents" ACM Sigmod Record 1998.*

(Continued)

*Primary Examiner* — Manglesh M Patel
*Assistant Examiner* — Nicholas Hasty
(74) *Attorney, Agent, or Firm* — Kilpatrick Townsend & Stockton LLP

(57) ABSTRACT

One or more computers receive input indicative of multiple files to be analyzed together, by performing one or more predetermined actions, using the contents (e.g. strings of text) of a corresponding one or more structures. The one or more structures are identified by the presence in each file, of corresponding names. The one or more structures are normally written into the files for use by an application program to layout the contents therein in a structured manner. The one or more computers are programmed to automatically parse each file, to identify therein the one or more layout structures e.g. based on the presence in each file of corresponding names of layout structures. After parsing, the one or more computer(s) perform the one or more predetermined actions, to obtain an output structure that holds the results based on the contents of each layout structure identified in each file.

20 Claims, 26 Drawing Sheets

(56) References Cited

U.S. PATENT DOCUMENTS

2006/0026122 A1* 2/2006 Hurwood .............. G06Q 10/10
 715/255
2006/0242180 A1* 10/2006 Graf ................. G06F 17/30917
2007/0217715 A1 9/2007 Newcomer et al.

OTHER PUBLICATIONS

SAS Text Analytics, Maximize the Value Buried in Your Unstructured Data Assets, 2010, pp. 4.
TreePad PLUS, Award-winning Personal Information Manager, Word Processor and More!, printed from http://www.treepad.com/treepadplus/, Feb. 16, 2010, pp. 4.
Provalis Research, WordStat 6.1, Computer Assisted Text Analysis, printed from http://www.provalisresearch.com/wordstat/Wordstat.html, Oct. 27, 2010, pp. 2.
Text Template Parser—Best Solutions for Your Business, printed from http://www.template-parser.com/ Oct. 25, 2010, pp. 3.
Advanced Query Syntax (Windows), printed from http://msdn.microsoft.com/en-us/library/aa965711.aspx, Apr. 27, 2011, pp. 10.
Harold, E. R. "XSL Formatting Objects", Chapter 18 of the XML Bible, Second Edition, 2001, pp. 67.
SAX 1.0 Overview by David Megginson, believed to be prior to May 5, 2000, printed from http://www.saxproject.org/sax1-roadmap,html, pp. 3.
SAX FAQ, Nov. 28, 2001, printed from http://www.saxproject.org/faq.html, pp. 4.

\* cited by examiner

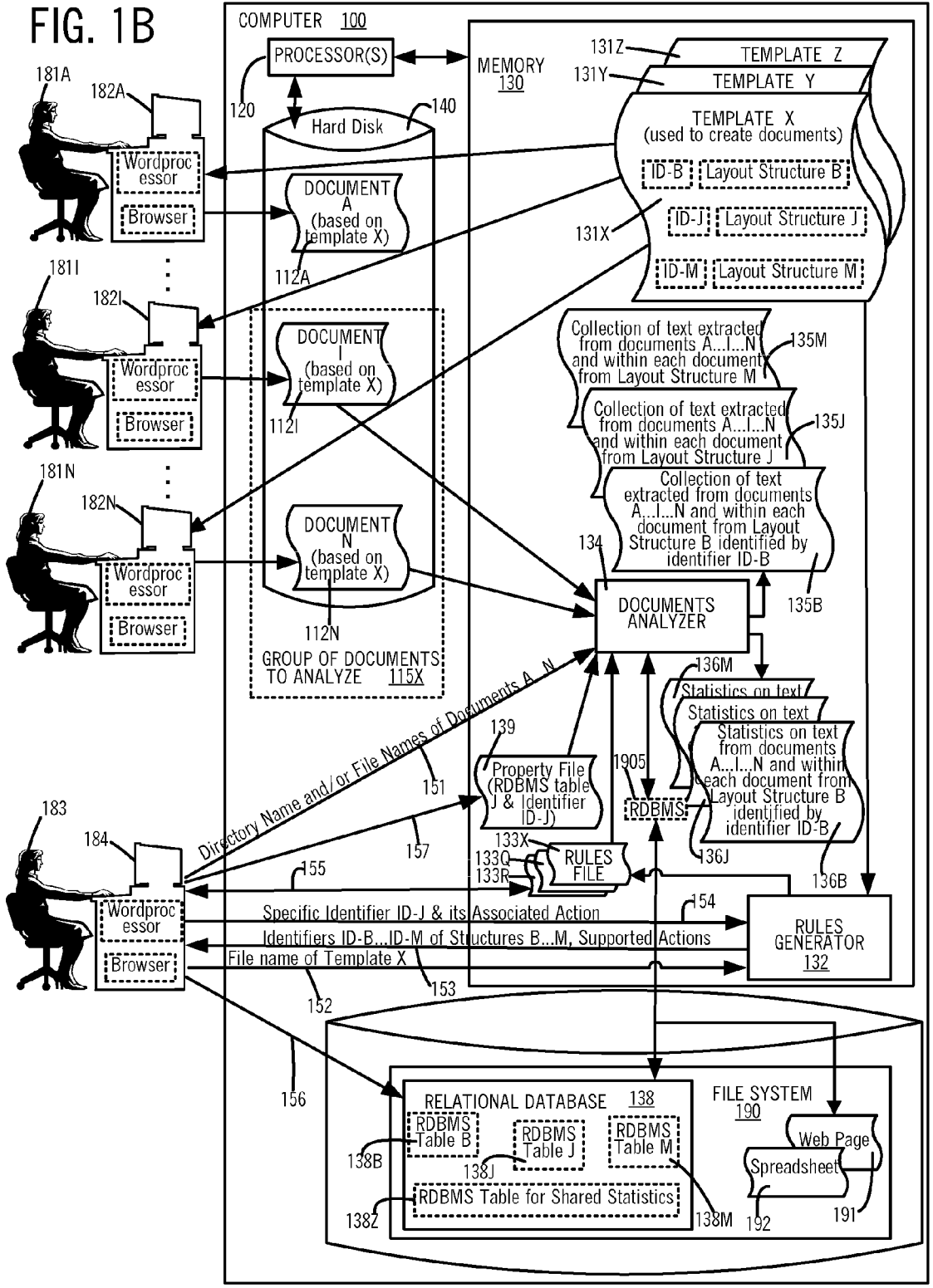

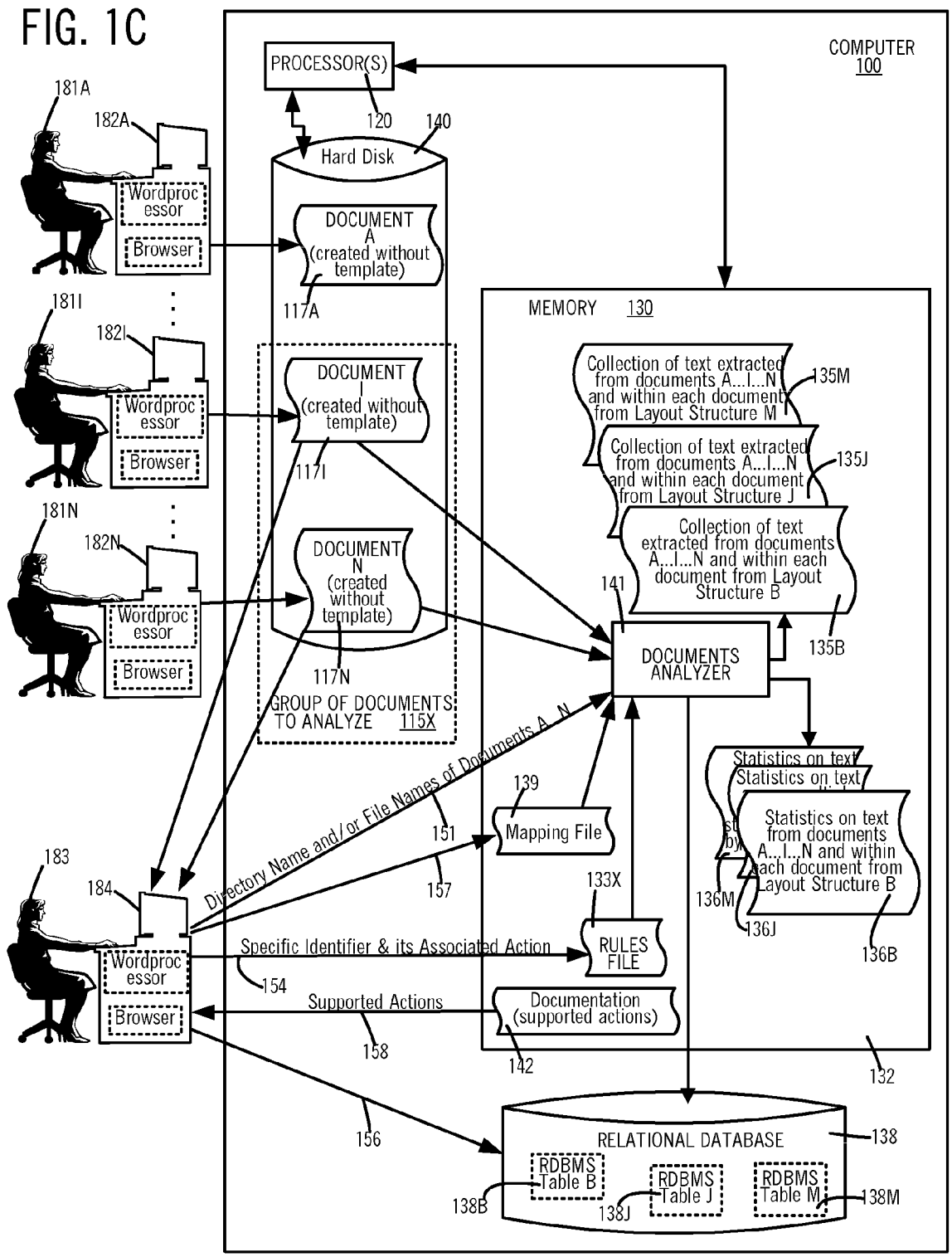

FIG. 2B

BUSINESS REQUIREMENTS DOCUMENT — 112A

STANDARDIZED DOCUMENTS ANALYZER (SDA) ANALYSIS OF DOCUMENTS — 220

Document Metadata

| Applications Release No: | Fusion v1.1 |
|---|---|
| Author: | Anish Desai |
| Creation Date: | 1/1/2008 8:10 AM |
| Last Updated: | 4/7/2011 1:10 PM |
| File URL: | http://files.oracle.com/anishdesai/SDA_BRD.doc |
| Document Version: | 0.8 |
| Status: | READY FOR APPROVAL |
| Template Version: | 1.5 |

Contributors

| Name | Role | Content Contribution |
|---|---|---|
| Anish Desai | Manager | Requirements |
| Lifang Yao | Designer | Algorithms |
| Sharad Bhardwaj | Implementer | Dependencies, Impacts, Issues |

Change Record

| Date | Name | Version | Change Reference |
|---|---|---|---|
| 5/1/2011 | Anish Desai | 0.8 | GUI - added file name field |
| 4/8/2011 | Sharad Bharadwaj | 0.7 | Identified Issue - File Name |

FIG. 2D

BUSINESS REQUIREMENTS DOCUMENT    112N
WEB PAGE PUBLISHER (WPP)
Web Page Preparation & Publication Document Metadata

| | |
|---|---|
| Applications Release No.: | Fusion v1.1 |
| Author: | Anish Desai |
| Creation Date: | 2/6/2010 6:51 PM |
| Last Updated: | 5/2/2011 5:10 PM |
| File URL: | http://files.oracle.com/anishdesai/WPP_BRD.doc |
| Document Version: | 0.1 |
| Status: | NOT STARTED |
| Template Version: | 1.5 |

Contributors

| Name | Role | Content Contribution |
|---|---|---|
| Anish Desai | Manager | Defined requirements |

Change Record

| Date | Name | Version | Change Reference |
|---|---|---|---|
| 2/5/2011 | Anish Desai | 0.1 | |

FIG. 2E

```
- <PARSING-RULE ACTION-SCOPE="TABLE">          ―258
  <ACTION-TYPE>EXTRACT_TABLE_CELLS</ACTION-TYPE>
  - <TABLE-DATA TABLE-FORMAT="VERTICAL">   ―259
    <PARSING-CONTEXT>COVER_PAGE</PARSING-CONTEXT>
    <TABLE-NAME>Document Metadata</TABLE-NAME>
    - <CELL-DATA>                             ―251
      <CELL-NAME>Applications Release No</CELL-NAME>
      </CELL-DATA>                          ―252
    - <CELL-DATA>
      <CELL-NAME>Author</CELL-NAME>
      </CELL-DATA>
    - <CELL-DATA>
      <CELL-NAME>Creation Date</CELL-NAME>
      </CELL-DATA>
    - <CELL-DATA>
      <CELL-NAME>Last Updated</CELL-NAME>
      </CELL-DATA>
    - <CELL-DATA>
      <CELL-NAME>File URL</CELL-NAME>
      </CELL-DATA>
    - <CELL-DATA>
      <CELL-NAME>Document Version</CELL-NAME>
      </CELL-DATA>
    - <CELL-DATA>
      <CELL-NAME>Status</CELL-NAME>
      </CELL-DATA>
    - <CELL-DATA>
      <CELL-NAME>Template Version</CELL-NAME>
      </CELL-DATA>
    </TABLE-DATA>
  </PARSING-RULE>
- <PARSING-RULE ACTION-SCOPE="TABLE">
  <ACTION-TYPE>EXTRACT_TABLE_CELLS</ACTION-TYPE>
  - <TABLE-DATA TABLE-FORMAT="HORIZONTAL">
    <PARSING-CONTEXT>COVER_PAGE</PARSING-CONTEXT>
    <TABLE-NAME>Contributors</TABLE-NAME>
```

```
- <CELL-DATA>
<CELL-NAME>Name</CELL-NAME>
</CELL-DATA>
- <CELL-DATA>
<CELL-NAME>Role</CELL-NAME>
</CELL-DATA>
- <CELL-DATA>
<CELL-NAME>Content Contribution</CELL-NAME>
</CELL-DATA>
</TABLE-DATA>
</PARSING-RULE>
- <PARSING-RULE ACTION-SCOPE="TABLE">
<ACTION-TYPE>EXTRACT_TABLE_CELLS</ACTION-TYPE>
- <TABLE-DATA TABLE-FORMAT="HORIZONTAL">
<PARSING-CONTEXT>COVER_PAGE</PARSING-CONTEXT>
<TABLE-NAME>Change Record</TABLE-NAME>
- <CELL-DATA>
<CELL-NAME>Date</CELL-NAME>
</CELL-DATA>
- <CELL-DATA>
<CELL-NAME>Name</CELL-NAME>
</CELL-DATA>
- <CELL-DATA>
<CELL-NAME>Version</CELL-NAME>
</CELL-DATA>
- <CELL-DATA>
<CELL-NAME>Change Reference</CELL-NAME>
</CELL-DATA>
</TABLE-DATA>
</PARSING-RULE>
```

FIG. 2H

```
- <PARSING-RULE ACTION-SCOPE="SECTION">
<ACTION-TYPE>CHECK_SECTION_EXISTENCE</ACTION-TYPE>
- <SECTION-DATA>
<PARENT-SECTION-NAME>In Scope Requirements
</PARENT-SECTION-NAME>
<SECTION-NAME>% - Requirement Group Name %</SECTION-NAME>
</SECTION-DATA>
</PARSING-RULE>
- <PARSING-RULE ACTION-SCOPE="SECTION">
<ACTION-TYPE>CHECK_SECTION_EXISTENCE</ACTION-TYPE>
- <SECTION-DATA>
<PARENT-SECTION-NAME>Out of Scope Requirements
</PARENT-SECTION-NAME>
<SECTION-NAME>% - Requirement Group Name %</SECTION-NAME>
</SECTION-DATA>
</PARSING-RULE>
```

```
BROWSER - Rules Generator                                    _ □ x
File | Edit | View | Favorites | Tools
Home | Print | Mail
```

Standardized Documents Analyzer (SDA) | User Guide | Reports | Contact Us

BUSINESS REQUIREMENTS DOCUMENT
\<Product Name\>
\<Subject\>

Document Metadata

| | |
|---|---|
| Applications Release: | |
| Author: | \<First Name Last Name\> |
| Creation Date: | 5/3/2007 8:39 AM |
| Last Updated: | 10/7/2008 3:19 PM |
| File URL: | http://files.oracle.com/... |
| Document Version: | 0.0 |
| Status: | \<NOT STARTED, IN DRAFT, REVIEW FEEDBACK INCORPORATED, READY FOR APPROVAL, APPROVED\> |
| Template Version: | 1.5 |

Popup menu (281, 282):
- EXTRACT_TABLE_DATA
- COUNT_TABLES
- COUNT_EMPTY_TABLE_CELLS Contributors

| Name | Role | Content Contribution |
|---|---|---|
| | | |
| | | |

Change Record

| Date | Name | Version | Change Reference |
|---|---|---|---|
| | | | |
| | | | |

FIG. 2K

SDA Rule Generator

Template Location: http://templates.oracle.com/FDD_template.doc    Submit    291

| Choose One | Section Hierarchy | Contains Table |
|---|---|---|
| ○ | 1. Authors | Yes |
| ○ | 2. Overview | No |
| ○ | 3. Business Objects | Yes |
| ○ | 3.1 Object Attributes | Yes |
| ○ | 3.2 Business Rules | Yes |
| ● | 3.3 Error Messages | Yes |

292

Determine Rule Attributes

Table Format:   Horizontal portion of a complex table ▾
Action:   Extract Table Data ▾

Choose Field Name
Available table Fields:
☒ Message Name
☐ Related Rule ID
☒ Message Type
☐ Message Text
☐ Additional Notes Excludes Empty Rows:   Yes ▾
Limit to Parent Section:   Business Objects ▾
Limit to Sub Sections:   Anywhere ▾

[ Add Another Rule ]

293

294

[ Generate Rule File ]

FIG. 3D

BROWSER - SDA Client Interface

File | Edit | View | Favorites | Tools
Home | Print | Mail

Standardized Documents Analyzer (SDA) | User Guide | Reports | Contact Us

| Field | Value |
|---|---|
| File Server: | http://files.oracle.com/... |
| Folder Name or Breadcrumb: | |
| Document Name: | |
| Process Sub-Directories: | Yes ▼ |
| Release Version: | 1.1 ▼ |
| Document Type: | Business Requirements Document ▼ |
| Action: | Extract All Contributors ▼ |
| Store Results to Repository: | Yes ▼ |
| Email to Receive Notification: | No ▼ |

SUBMIT

FIG. 3E

BROWSER - SDA Client Interface

File | Edit | View | Favorites | Tools
Home | Print | Mail

Standardized Documents Analyzer (SDA) | User Guide | Reports | Contact Us

| Product | Name | Role | Content Contribution |
|---|---|---|---|
| standardized documents Analyzer | Anish Desai | Manager | Requirements |
| standardized documents Analyzer | Lifang Yao | Designer | Algorithms |
| standardized documents Analyzer | Sharad Bhardwaj | Implementer | Dependencies, Impacts, Issues |
| Web Page Publisher | Anish Desai | Manager | Defined requirements |
| Specification Search Engine | Anish Desai | Designer | Algorithms |
| Specification Search Engine | Sharad Bhardwaj | Implementer | Glossary |
| Specification Search Engine | Scott Bangert | Manager | Requirements Specification |

Return

FIG. 3F

BROWSER - SDA Client Interface

File | Edit | View | Favorites | Tools
Home | Print | Mail

Standardized Documents Analyzer (SDA) | User Guide | Reports | Contact Us

File Server: http://files.oracle.com/...
Folder Name or Breadcrumb:
Document Name:
Process Sub-Directories: Yes
Release Version: 1.1
Document Type: Functional Design Document
Action: Extract Authors
Store Results to Repository: Yes
Email to Receive Notification: No

SUBMIT

FIG. 3G

BROWSER - SDA Client Interface

File | Edit | View | Favorites | Tools
Home | Print | Mail

Standardized Documents Analyzer (SDA) | User Guide | Reports | Contact Us

| Product | Author |
|---|---|
| standardized documents Analyzer | Anish Desai |
| Specification Search Engine | Lifang Yao |
| Web Page Publisher | Anish Desai |

Return

FIG. 4A

```
<?xml version="1.0" encoding="utf-8" ?>
- <!--
xslt1.0-compatibility
  -->
- <xsl:stylesheet version="2.0" xmlns:xsl="http://www.w3.org/1999/
  XSL/Transform" xmlns:fo="http://www.w3.org/1999/XSL/Format"
  xmlns:ora="http://www.oracle.com/XSL/Transform/java/"
  xmlns:xdofo="http://xmlns.oracle.com/oxp/fo/extensions"
  xmlns:xdoxslt="http://www.oracle.com/XSL/Transform/java/
  oracle.xdo.template.rtf.XSLTFunctions"
  xmlns:xdoxliff="urn:oasis:names:tc:xliff:document:1.1"
  xmlns:xlink="http://www.w3.org/1999/xlink">
    <xsl:param name="_XDOCALENDAR">GREGORIAN</xsl:param>
    <xsl:param name="_XDOLOCALE">en-US</xsl:param>
    <xsl:param name="_XDOTIMEZONE">GMT</xsl:param>

...

<xdofo:list-style style-id="2" template-id="-120" />
    <xdofo:list-style style-id="1" template-id="-119" />
  </xdofo:list-styles>
- <fo:layout-master-set>
- <fo:simple-page-master master-name="master0" margin-left="30.6pt"
  margin-right="30.6pt" page-height="792.0pt" page-width="612.0pt"
  margin-top="21.6pt" margin-bottom="36.0pt">
    <fo:region-before region-name="region-header" extent="14.4pt" />
    <fo:region-body region-name="region-body" margin-top="14.4pt"
  margin-bottom="18.0pt" />
    <fo:region-after region-name="region-footer" extent="18.0pt" display-
  align="after" />
  </fo:simple-page-master>
  </fo:layout-master-set>
- <fo:page-sequence master-reference="master0">
    <fo:title>BUSINESS REQUIREMENTS DOCUMENT</fo:title>

...

- <fo:block padding-top="6.0pt" orphans="2" linefeed-treatment="preserve"
  padding-bottom="6.0pt" text-align="start" widows="2" height="0.0pt" end-
  indent="5.4pt" start-indent="5.4pt" keep-together="always">

<fo:inline xml:space="preserve" style-id="s0" font-weight="bold" font-
  size="12.0pt" height="13.836pt" style-name="Table Heading" white-space-
  collapse="false" font-family="Times New Roman">Document Metadata</
  fo:inline>

<fo:inline style-id="s0" font-weight="bold" font-size="9.0pt"
  height="10.377pt" style-name="Table Heading" white-space-collapse="false"
  font-family="Times New Roman">:</fo:inline>
  </fo:block>
```

FIG. 4B

```
                          Document - Word Processor                      _ □ X
Home Insert View Layout Print
Paste  Times Roman  ▼12▼ A a x² x₂ B I U abc ≡ ≡ ≡  Find & Replace  Table  List  Section
    Ruler        ♦      1        2        3        4        5        6        ♦

- <fo:block padding-top="0.25pt" orphans="2" linefeed-
      treatment="preserve" padding-bottom="0.25pt" text-align="start"
      widows="2" end-indent="5.4pt">

- <fo:table start-indent="0.0pt" style-id="ts11" style-name="Normal Table"
      xdofo:table-summary="Template Table 1" xdofo:row-header-count="0">

<xsl:variable name="_XDOFOPOS2" select="number(1)" />
         <xsl:variable name="_XDOFOTOTAL" select="number(1)" />

...

<fo:table-column column-width="131.4pt" />
         <fo:table-column column-width="216.0pt" />
         ...
      - <fo:table-body>

- <fo:table-row>
      - <fo:table-cell padding-start="5.15pt" vertical-align="top" border-
      bottom="0.5pt solid #000000" border-end-color="#000000" padding-
      top="0.0pt" border-end-style="solid" border-start-color="#000000"
      padding-end="5.15pt" number-columns-spanned="1" border-top="0.5pt
      solid #000000" border-start-style="solid" height="0.0pt" border-end-
      width="0.5pt" padding-bottom="0.0pt" border-start-width="0.5pt"
      background-color="#e0e0e0">
      - <fo:block padding-top="6.0pt" orphans="2" linefeed-treatment="preserve"
      padding-bottom="6.0pt" text-align="start" widows="2" start-indent="0.0pt"
      end-indent="0.0pt" keep-together="always">
         <fo:inline style-name="Table Heading" height="9.0pt" white-space-
      collapse="false" font-size="9.0pt" font-family="Times New Roman" font-
      weight="bold">Applications Release No.</fo:inline>
         </fo:block>
         </fo:table-cell>
      - <fo:table-cell padding-start="5.15pt" vertical-align="top" border-
      bottom="0.5pt solid #000000" border-end-color="#000000" padding-
      top="0.0pt" border-end-style="solid" border-start-color="#000000"
      padding-end="5.15pt" number-columns-spanned="1" border-top="0.5pt
      solid #000000" border-start-style="solid" height="0.0pt" border-end-
      width="0.5pt" padding-bottom="0.0pt" border-start-width="0.5pt">
      - <fo:block xdofo:tab-stops="left:103.5pt:space" padding-top="6.0pt"
      orphans="2" linefeed-treatment="preserve" padding-bottom="6.0pt" text-
      align="start" widows="2" start-indent="0.0pt" end-indent="0.0pt">
         <fo:inline style-name="Cover Page Text" height="10.0pt" white-space-
      collapse="false" font-size="10.0pt" font-family="Times New
      Roman">Fusion v1.1</fo:inline>
         </fo:block>
         </fo:table-cell>
```

FIG. 4C

```
- <fo:table-row>
  - <fo:table-cell padding-start="5.15pt" vertical-align="top" border-
    bottom="0.5pt solid #000000" border-end-color="#000000" padding-
    top="0.0pt" border-end-style="solid" border-start-color="#000000"
    padding-end="5.15pt" number-columns-spanned="1" border-top="0.5pt
    solid #000000" border-start-style="solid" height="0.0pt" border-end-
    width="0.5pt" padding-bottom="0.0pt" border-start-width="0.5pt"
    background-color="#e0e0e0">
    - <fo:block padding-top="6.0pt" orphans="2" linefeed-
      treatment="preserve" padding-bottom="6.0pt" text-align="start"
      widows="2" start-indent="0.0pt" end-indent="0.0pt" keep-
      together="always">
        <fo:inline style-name="Table Heading" height="9.0pt" white-space-
        collapse="false" font-size="9.0pt" font-family="Times New Roman" font-
        weight="bold">Author</fo:inline>
      </fo:block>
    </fo:table-cell>
  - <fo:table-cell padding-start="5.15pt" vertical-align="top" border-
    bottom="0.5pt solid #000000" border-end-color="#000000" padding-
    top="0.0pt" border-end-style="solid" border-start-color="#000000"
    padding-end="5.15pt" number-columns-spanned="1" border-top="0.5pt
    solid #000000" border-start-style="solid" height="0.0pt" border-end-
    width="0.5pt" padding-bottom="0.0pt" border-start-width="0.5pt">
    - <fo:block xdofo:tab-stops="left:103.5pt:space" padding-top="6.0pt"
      orphans="2" linefeed-treatment="preserve" padding-bottom="6.0pt" text-
      align="start" widows="2" start-indent="0.0pt" end-indent="0.0pt">
        <fo:inline style-name="Cover Page Text" height="10.0pt" white-space-
        collapse="false" font-size="10.0pt" font-family="Times New Roman"
        font-style="italic">Anish Desai</fo:inline>
      </fo:block>
    </fo:table-cell>
  </fo:table-row>

- <fo:table-row>

- <fo:table-cell padding-start="5.15pt" vertical-align="top" border-
    bottom="0.5pt solid #000000" border-end-color="#000000" padding-
    top="0.0pt" border-end-style="solid" border-start-color="#000000"
    padding-end="5.15pt" number-columns-spanned="1" border-top="0.5pt
    solid #000000" border-start-style="solid" height="0.0pt" border-end-
    width="0.5pt" padding-bottom="0.0pt" border-start-width="0.5pt"
    background-color="#e0e0e0">

- <fo:block padding-top="6.0pt" orphans="2" linefeed-
      treatment="preserve" padding-bottom="6.0pt" text-align="start"
      widows="2" start-indent="0.0pt" end-indent="0.0pt" keep-
      together="always">

<fo:inline style-name="Table Heading" height="9.0pt" white-space-
        collapse="false" font-size="9.0pt" font-family="Times New Roman" font-
        weight="bold" color="#c0c0c0">Template Version</fo:inline>

</fo:block>

</fo:table-cell>
```

FIG. 4D

```
- <fo:table-cell padding-start="5.15pt" vertical-align="top" border-
  bottom="0.5pt solid #000000" border-end-color="#000000" padding-
  top="0.0pt" border-end-style="solid" border-start-color="#000000"
  padding-end="5.15pt" number-columns-spanned="1" border-top="0.5pt
  solid #000000" border-start-style="solid" height="0.0pt" border-end-
  width="0.5pt" padding-bottom="0.0pt" border-start-width="0.5pt">

- <fo:block xdofo:tab-stops="left:103.5pt:space" padding-top="6.0pt"
  orphans="2" linefeed-treatment="preserve" padding-bottom="6.0pt" text-
  align="start" widows="2" start-indent="0.0pt" end-indent="0.0pt">

</fo:block>

</fo:table-cell>

</fo:table-row>

</fo:table-body>

</fo:table>

</fo:block>

...
```

```
<PARSING-RULE ACTION-SCOPE="TABLE">
    <ACTION-TYPE>EXTRACT_TABLE_CELLS</ACTION-TYPE>
    <TABLE-DATA TABLE-FORMAT="HORIZONTAL">
        <TABLE-NAME>Business Rules</TABLE-NAME>
        <CELL-DATA>
            <CELL-NAME>Business Rule ID</CELL-NAME>
        </CELL-DATA>
        <CELL-DATA>
            <CELL-NAME>Description</CELL-NAME>
        </CELL-DATA>
    </TABLE-DATA>
</PARSING-RULE>
```

FIG. 6A

```
<PARSING-RULE ACTION-SCOPE="TABLE">
    <ACTION-TYPE>COUNT_TABLE_ROWS</ACTION-TYPE>
    <TABLE-DATA TABLE-FORMAT="HORIZONTAL">
        <TABLE-NAME>Solution Components List</TABLE-NAME>
        <EXLUDE-DEFAULT-TABLE-DATA>YES
        </EXLUDE-DEFAULT-TABLE-DATA>
        <KEY-TABLE-CELL>Component Name</KEY-TABLE-CELL>
        <KEY-TABLE-CELL-DEFAULT-TYPE>EMPTY
        </KEY-TABLE-CELL-DEFAULT-TYPE>
    </TABLE-DATA>
</PARSING-RULE>
```

FIG. 6B

```
<PARSING-RULE ACTION-SCOPE="TABLE">
    <ACTION-TYPE>COUNT_TABLE_CELLS_WITH_DEFAULT_TEXT</ACTION-TYPE>
    <TABLE-DATA TABLE-FORMAT="COMPLEX_VERTICAL">
        <TABLE-NAME>Features In Scope</TABLE-NAME>
        <EXLUDE-DEFAULT-TABLE-DATA>YES</EXLUDE-DEFAULT-TABLE-DATA>
        <KEY-TABLE-CELL>Priority</KEY-TABLE-CELL>
        <KEY-TABLE-CELL-FORMAT>COMPLEX_VERTICAL</KEY-TABLE-CELL-FORMAT>
        <KEY-TABLE-CELL-DEFAULT-TYPE>TEXT</KEY-TABLE-CELL-DEFAULT-TYPE>
        <TABLE-KEY-DEFAULT-TEXT>Must Have Should Have Nice to Have
          </TABLE-KEY-DEFAULT-TEXT>
        <CELL-DATA>
            <CELL-NAME>Priority</CELL-NAME>
            <CELL-VALUE>Must Have Should Have Nice to Have</CELL-VALUE>
        </CELL-DATA>
        <CELL-DATA>
            <CELL-NAME>High Volume Throughput</CELL-NAME>
            <CELL-VALUE>Yes/No (include comments)</CELL-VALUE>
        </CELL-DATA>
        <CELL-DATA>
            <CELL-NAME>High Concurrency</CELL-NAME>
            <CELL-VALUE>Yes/No (include comments)</CELL-VALUE>
        </CELL-DATA>
        <CELL-DATA>
            <CELL-NAME>Transaction Flow</CELL-NAME>
            <CELL-VALUE>Yes/No (include comments)</CELL-VALUE>
        </CELL-DATA>
    </TABLE-DATA>
</PARSING-RULE>
```

FIG. 6C

```
<PARSING-RULE ACTION-SCOPE="TABLE">
<ACTION-TYPE>COUNT_TABLE_ROWS</ACTION-TYPE>
    <TABLE-DATA TABLE-FORMAT="HORIZONTAL">
        <TABLE-NAME>Requirement For EBS</TABLE-NAME>
        <EXLUDE-DEFAULT-TABLE-DATA>YES
          </EXLUDE-DEFAULT-TABLE-DATA>
        <KEY-TABLE-CELL>Component Name</KEY-TABLE-CELL>
        <KEY-TABLE-CELL-DEFAULT-TYPE>EMPTY
          </KEY-TABLE-CELL-DEFAULT-TYPE>
        <PARENT-SECTION-NAME>Features In Scope</ PARENT-
    SECTION-NAME >
    </TABLE-DATA>
</PARSING-RULE>
```

FIG. 6D

ANALYSIS OF DOCUMENTS USING RULES

BACKGROUND

Due to proprietary nature of formats in which documents containing text (in any natural language) are formatted by a common word-processing program (such as WORD sold by MICROSOFT CORPORATION or WORDPERFECT sold by COREL CORPORATION), if any analysis is to be done, it becomes necessary for such documents to be reviewed manually. For example, a human typically reviews a group of documents by individually reviewing each document one at a time, specifically by opening each document in a word-processing program, visually reading text displayed therein (using the human's eyes), until a specific text of interest is found. The human then performs some analysis of the specific text of interest, e.g. manually counts the number of rows in a specific table in the document. However, manual review of a large number of documents becomes laborious, time consuming and inefficient for a human.

Several solutions to automatically extract contents of word processing documents have been developed in the past. However, such prior art solutions appear to work on documents containing specific format and content e.g. at specific positions. In other words, the prior art solutions that are known to the inventors cannot be utilized as a generic solution across documents containing different format and content by the users without rewriting the code. Most of such solutions also simply extract the content from word processing documents, and lack capabilities to analyze document content to collect actionable intelligence.

The current inventors believe that a solution to automatically analyze documents of different types and containing different content would dramatically improve efficiencies and accuracy of people and companies using word processing documents. The current inventors further believe that there is a need to automatically perform analysis of multiple documents for one or more user-specified subset(s) of content within each document, e.g. to limit a search to count a number of rows in a specific table or to search only a specific subsection in a specific section, by use of an invention of the type described below.

SUMMARY

One or more computers are programmed in accordance with the invention to receive input (e.g. from a user) that is indicative of word-processing documents in electronic form, which are to be analyzed together. Therefore, in some embodiments, multiple word-processing documents are to be analyzed in response to a single command input by a user that identifies, for example, a directory name and/or portion(s) of file names. The multiple word-processing documents are to be analyzed, by performing one or more predetermined actions that are associated with one or more structures, based on user input. Each predetermined action is performed based on document contents (e.g. strings of text) that are structured by a structure that is associated by a rule with that predetermined action, wherever that specific structure happens to be found, in each word-processing document among the multiple word-processing documents to satisfy a condition in the rule.

Depending on the embodiment, the one or more structures are identified (for performance of the associated one or more actions) by the presence in each word-processing document, of certain text (e.g. a word or sequence of words) that form a name (or other such identifier), arranged in a specific sequence relative to the structure (e.g. before the structure).

The structure (also called "layout structure") in each word-processing document is used by the application program to layout the words of text therein, in a structured form on a page that is to be displayed on a screen or printed on paper. An example of a layout structure is a word-processing table used by a word-processor to display/print words of text in a tabular form on a page. Another example of a layout structure is a word-processing section used by the word-processor to display/print text in a hierarchy of sections and subsections arranged indented relative to one another, on one or more pages.

In several embodiments, several different layout structures are initially created in a word-processing document manually by a user inputting words of text into a feature of an application program (e.g. a word-processing program) to insert a layout structure. The user also inputs into the word-processing document, an identifier for the layout structure e.g. a word or sequence of words chosen by the user to denote a table name or a section heading in the word-processing document. Depending on the embodiment, the identifier can be inserted in the word-processing document either preceding the layout structure, or following the layout structure, or in a specific portion within the layout structure. The layout structures and their identifiers are additionally used by the user to form a condition in a rule, to be later used in analysis of the word-processing document. In forming the rule, the user also identifies a specific action to be performed whenever the layout structure identified by an identifier in the rule's condition is found in a document, by one or more computers programmed with software (called "document analyzer") in accordance with the invention.

In some embodiments, a word-processing document that is initially created as described in the preceding paragraph above is later used as a template as follows. The template is instantiated by one or more users, by making copies of the template and then manually changing words of text in the copies, thereby to obtain additional word-processing documents (also called "standardized documents"). A number of such documents are then searched using one or more rules of the type described above, in one or more computers programmed with the document analyzer, in accordance with the invention.

In alternative embodiments of the invention, multiple word-processing documents are created by one or more users without using a template of the type described in the preceding paragraph above, and instead the users manually supply input to features of the application program to insert layout structures and their identifiers into each word-processing document. In the alternative embodiments, whenever manually supplied identifiers of layout structures match the identifier in a condition in a rule of the type described above, a corresponding action is performed by the one or more computers programmed with the document analyzer, in accordance with the invention.

Computer(s) programmed with the document analyzer apply one or more rules of the type described above, to search each document as follows. Specifically, in some embodiments, the computer(s) automatically remove images from each document among multiple documents (to be analyzed as identified by user command), and then convert each document into a markup language and then identify within each document one or more layout structures satisfying a condition in a rule that identifies an associated action. Depending on the embodiment, a layout structure satisfying a rule's condition can be identified within each document in several ways. For example, the presence in each document, of an identifier of a layout structure is checked for presence of the same identifier in a rule's condition for the layout structure.

In response to every match (between an identifier in a document and the condition of a rule), an associated action specified in a rule is performed using the words of text in the layout structure identified by the identifier. Each action is performed based on a layout structure found to be present in each document, and the results of such actions on multiple documents are collected together for output. The collection of results across multiple documents, and specific to a layout structure identified by a specific identifier, are stored in a non-transitory memory accessible to the one or more computer(s) for future use, e.g. to further process, display and/or print the results in the collection.

BRIEF DESCRIPTION OF THE FIGURES

FIG. 1B illustrates, in a block diagram, computer 100 of FIG. 1A in accordance with the invention including a document repository that holds documents to be analyzed, a database that holds an output structure, and a memory that includes a documents analyzer, a rules generator, a template and a rules file.

FIG. 1C illustrates, in a block diagram an alternative embodiment of computer 100 of FIG. 1B wherein templates are not used, also in accordance with the invention.

FIGS. 2B, 2C and 2D each illustrate a display on a computer screen, of a document of the type illustrated in FIG. 1B in some aspects of the invention.

FIGS. 2E and 2F illustrate rules in a rules file 133X of the type illustrated in FIG. 1B for use in identifying tables of the template shown in FIG. 2A and for acting on table contents in the documents shown in FIGS. 2B-2D, in some aspects of the invention.

FIG. 2H illustrates another rule in the rules file 133X of FIGS. 2E and 2F for use in identifying sections of the template shown in FIG. 2G and acting on section contents in documents of the type shown in FIGS. 2B-2D, in some aspects of the invention.

FIGS. 2I and 2K illustrate, in alternative embodiments, a display on a computer screen, to receive user input selecting a to-be-performed action for a layout structure, in some aspects of the invention.

FIGS. 3D and 3F each illustrate a display on a computer screen, of a web page displayed by a browser, the web page having been generated by the documents analyzer of FIG. 1B to receive input on documents to be analyzed, in some embodiments of the invention.

FIGS. 3E and 3G each illustrate a display on the computer screen, of another web page displayed by the browser and generated by a documents analyzer to provide output after analysis of the documents, in some embodiments of the invention.

FIGS. 4A-4D each illustrate a display on a computer screen, of a temporary file in computer memory opened and displayed in a word processor, in some aspects of the invention.

FIGS. 6A, 6B, 6C and 6D illustrate four examples of rules that are processed in accordance with the invention.

DETAILED DESCRIPTION

Figure 1A:
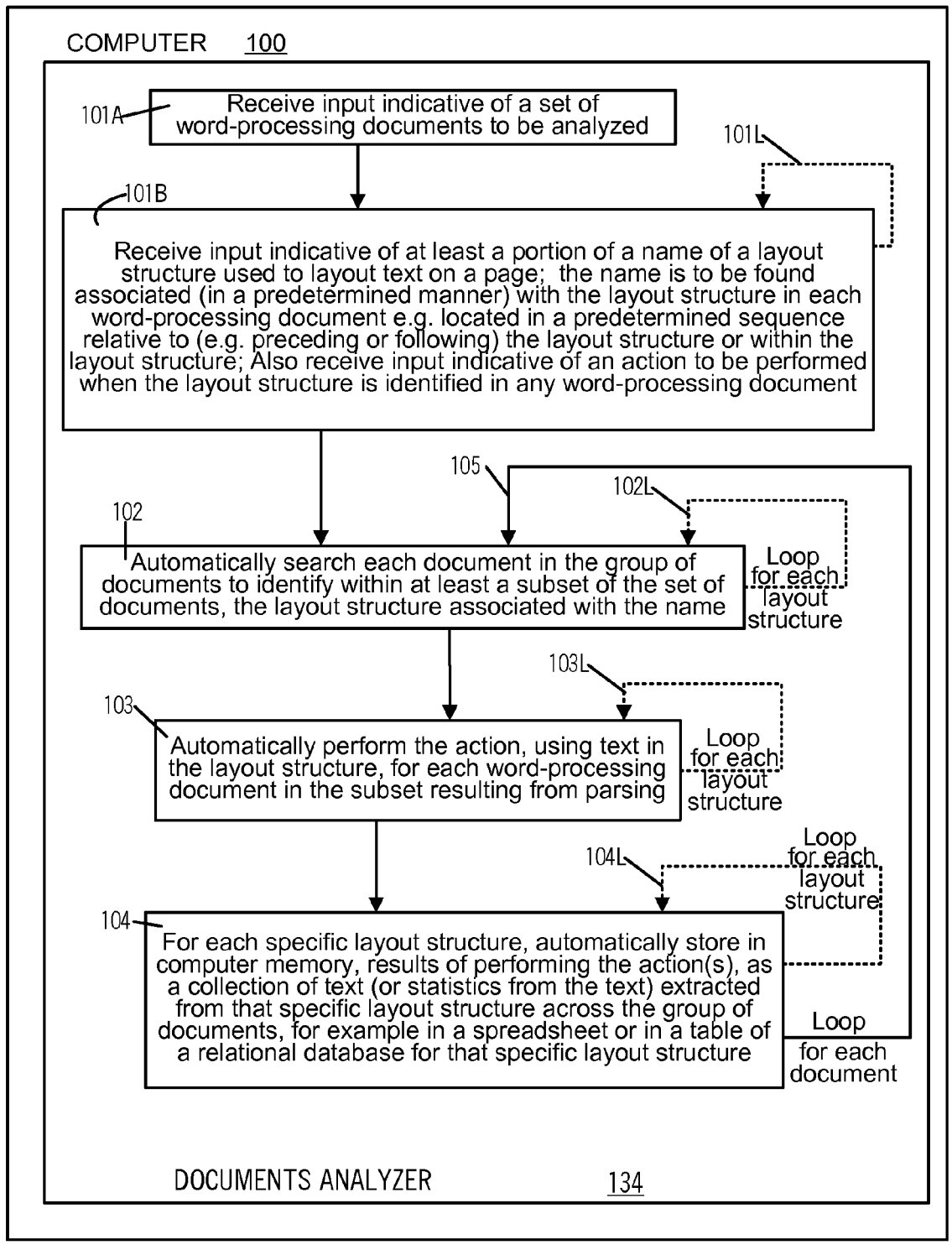
FIG. 1A illustrates, in a flow chart, a method performed by a processor in a computer 100, in some embodiments of the invention.

A processor 120 in a computer 100 is programmed with software instructions 134 in accordance with the invention to perform a method of the type illustrated in FIG. 1A, e.g. to receive in act 101A, input (e.g. from a user) that is indicative of a group of documents which are to be analyzed. The input may be provided in a client computer 184 (FIG. 1B) by a human user 183 via an input device such as a keyboard and/or a mouse (not shown). Client computer 184 supplies the user input via a wired or wireless link 151 to a server computer 100 and on receipt the user input is stored in memory 130, in the normal manner.

The user input received in act 101A may identify, for example, a name of a directory in hard disk 140 e.g. in the form of a URL (uniform resource locator), and in this specific case all documents in the identified directory constitute a group 115X of documents that are automatically parsed by a processor 120 when executing software instructions 134 (also called document analyzer), as per act 102 (FIG. 1A), which can be performed repeatedly as per loop 102L (for each layout structure). Alternatively or additionally, the user input on link 151 that is received in act 101A may specify names, of files to be identified by searching multiple subdirectories in the identified directory. The file names may be specified by user 183 in the normal manner, e.g. via a search term (with a wild card), in which case those files at the user-specified URL or in subdirectories thereof, that have file names matching the search term, constitute the group 115X of documents that are automatically parsed as per act 102 (FIG. 1A).

Moreover, in act 101B, computer 100 receives two additional user inputs as follows: one input is indicative of a condition on at least a portion of a name or other identifier (e.g. identifier ID-J in FIG. 1B) to identify a structure J used by a word-processor to layout text on a page that is to be displayed on a screen or printed on paper. One example of structure J is a table used to display/print text in a tabular form, while another example of structure J is a section used to display/print text in a hierarchy of sections and subsections. The just-described structure J (also called "layout structure") is identified by its name ID-J being located adjacent thereto, in a predetermined sequence relative to (e.g. located before) structure J. Note that use of a name or identifier ID-J to identify a layout structure J as described herein eliminates a prior art need to use a position of the layout structure in a page. Instead, when the name or identifier ID-J is found (to be in the predetermined sequence) with the layout structure in any word-processing document to meet a condition, text within the layout structure is used in an action that is itself indicated by another input from the user. The just-described two user inputs (i.e. user input on a condition and user input on an action) are internally associated with one another by computer 100, to form a rule.

Note that action 101B can be performed in a loop (see branch 101L in FIG. 1A) as often as needed, e.g. once for each layout structure in a word-processing document to be analyzed. Further note that actions 101B and 101A are independent of one another and therefore can be performed in any order relative to one another.

In some embodiments, after inputs are received as noted above in reference to acts 101A and 101B, a document 112I is searched in an act 102 (FIG. 1A) to identify each layout structure that is associated with an action by a rule. In performing the search, computer 100 uses the predetermined identifier (e.g. identifier ID-J in FIG. 1B) to identify the structure J as being present in document 112I. In some embodiments, to ensure that identifier ID-J and a corresponding structure J are both present in a specific sequence relative to one another (e.g. ID-J being before structure J) in document 112I, the documents 112I . . . 112N that are being searched in act 102 are all created by use of a common template 131X (see FIG. 1B). Specifically, one or more human users 181A-181N (e.g. who work for and report to user 183 in an organization) supply input (e.g. via keyboards of computers 182A-182N) in the form of text (and optionally graphics) for insertion into templates 131X-131Z by use of word-processing software (also called "word-processor") that interfaces directly or indirectly with the one or more of respective computers 182A-182N.

During document creation, the input by each user 181I is used by a computer 182I programmed with the word-processor to replace (i.e. overwrite) default sample text (or blanks) in a local copy of template 131X, thereby creating a customized copy in a memory of computer 182I, which is then saved to hard disk 140 (or other non-transitory memory) of server computer 100 as a document 112I. Document 112I that is generated in the just-described manner, by modification of a template 131X that is pre-existing, is also referred to herein as a standardized document.

In the example illustrated in FIG. 1B, a number of different standardized documents 112A . . . 112I . . . 112N are generated from the same template 131X, and a subset of these standardized documents 112I . . . 112N form group 115X. Template 131X includes several structures B . . . J . . . M that are identified by respective identifiers ID-B, ID-J and ID-M. The structures (also called "layout structures") B . . . J . . . M are present in template 131X, e.g. in binary form (originally created in the template 131X by the word-processing software, such as WORD available from Microsoft Corporation). These structures B . . . J . . . M and their identifiers ID-B, ID-J and ID-M are retained in a new document 112I after it is created by user 181I copying template 131X and editing new document 112I to input text into one or more of structures B . . . J . . . M.

Accordingly, a number of identifiers ID-B, ID-J and ID-M are present in template 131X, in a predetermined sequence relative to corresponding layout structures B . . . J . . . M. Depending on the embodiment, identifiers ID-B, ID-J and ID-M may be either (a) pre-existing in template 131X as text that was previously supplied by user 183 during creation of template 131X or (b) deliberately added to template 131X (manually or automatically) to facilitate identification of corresponding layout structures B . . . J . . . M during parsing of documents 112I . . . 112N in act 102 (FIG. 1A).

Note that after a document 112I has been created, user 181I may make any number of changes therein, including duplicating (by cutting and pasting) one or more of structures B . . . J . . . M and their identifiers ID-B, ID-J and ID-M as well as creating new layout structures. Document analyzer 134 is able to analyze document 112I even when multiple copies of structures B . . . J . . . M and identifiers ID-B, ID-J and ID-M are present in document 112I, because document analyzer 134 is not hardcoded with physical positions and/or dimensions of structures B . . . J . . . M in a page, and instead document analyzer 134 uses rules (expressed in a position-independent format), of the type described below.

In some embodiments each identifier ID-J is manually inserted by user 183 when creating template 131X, and positioned therein in sequence immediately before (i.e. preceding) the corresponding layout structure J. For example, layout structure J can be a section having a hierarchy of subsections, and identifier ID-J is inserted into template 131X as the upper-most heading of section J. Depending on the implementation, space (i.e. blank) or other characters can be allowed to be present between a layout structure J and its identifier ID-J. Also depending on the embodiment, each identifier ID-J may be inserted by user 183 immediately before (i.e. preceding) the corresponding layout structure J in template 131X. For example, layout structure J can be a table having cells (also called "tabular cells"), and a name of the table can be inserted by a user as identifier ID-J immediately before the table J. Hence, whenever a standardized document 112I is created from a template 131X, the layout structures B . . . J . . . M as well as their identifiers ID-B, ID-J and ID-M in that template 131X are copied into each standardized document 112I that is then customized by a user 181I.

During normal operation, a number of additional documents (not shown in FIG. 1B) are also generated by human users 181A-181N, by use of other templates 131Y and 131Z, and therefore these additional documents are also standardized documents that are stored in a hard disk 140. As the additional documents are generated by use of other templates 131Y and 131Z, they are identified by user 183 in other respective groups to be analyzed together (not shown in FIG. 1B), but none of these additional documents is to be identified in the group 115X which identifies standardized documents 112I . . . 112N that are based on template 131X. If due to user error in the input received via link 151, a document that is identified in group 115X is found to have not been created by use of template 131X, an error message is created by computer 100 and the error message is stored in a non-transitory memory of computer 100 and optionally the error message is transmitted to computer 184, and displayed to user 183.

In summary, by analysis in act 102 (described above), a layout structure J is identified in each document 112I in the user-identified group 115. Thereafter, the contents of layout structure J in each document 112I are used to perform an action associated with structure J, in act 103. In several embodiments, an action associated with a layout structure J is performed multiple times (as per act 103L) respectively on the contents existing in multiple copies of structure J in the corresponding multiple documents 112I . . . 112N. Thereafter, the results of performing the action on multiple copies of structure J are stored, as per act 104 in FIG. 1A, which can be performed repeatedly as per act 104L once for each layout structure J. Note that document analyzer 134 may loop over each document (as per act 105) thereby to perform acts 102-104 multiple times. The above-described results generated by document analyzer 134 for each document are stored together for each structure J, e.g. as collection 135J or as statistics 136J, although the contents acted upon are obtained from multiple documents 112I . . . 112N. In some embodiments, different actions are associated with different structures B . . . J . . . M, thereby to generate respective collections 135B . . . 135J . . . 135M.

In some embodiments, the one or more actions associated with a structure J are specified in the form of rules in a rules file 133X (FIG. 1B) that is input to processor 120 executing software 134 (also called document analyzer) in computer 100. Rules file 133 may be generated in any manner i.e. either manually or automatically or some combination thereof. In some embodiments rules file 133X is initially generated by invocation of a rules generator 132. Specifically, rules generator 132 is invoked by a file name of a template 131X specified on a wired or wireless link 152, by user 183 via computer 184. Rules generator 132 automatically parses template 131X specified in the file name on link 152, to identify all layout structures B . . . J . . . M therein that are identified by respective identifiers ID-B, ID-J and ID-M, and supplies them to computer 184 on a link 153, which are then displayed to user 183.

User 183 then identifies to computer 184, a specific action to be performed on a specific layout structure by document analyzer 134. In an illustrative embodiment, a drop-down list of actions that are supported by (i.e. can be performed by) document analyzer 134 are displayed to user 183, to allow the user to point and click on one of the actions using a mouse, thereby to indicate selection of that action. Examples of actions include copying of text in the layout structure, counting up the number of words in the layout structure, etc.

Computer 184 responds to user selection of an action by forming an association between a specific identifier ID-J and the user-selected action. Computer 184 then transmits to rules generator 132 in computer 100 on a link 154 thereof, each specific identifier ID-J of a layout structure J and its associated action (as selected by user 183). In some embodiments, computer 184 displays a web page (e.g. expressed in HTML) that is received from a web server executing in computer 100 that contains identifier ID-J and a list of actions, and then sends to computer 100 any input received in the displayed web page from user 183, so in such embodiments it is computer 100 that forms the above-described association.

Therefore, based on input from user 183, rules generator 132 creates rules file 133X by writing therein each specific identifier ID-J or a portion thereof in a condition and its associated action. Each identifier ID-J in a condition and an action associated therewith together form a rule, and therefore there may be as many rules in rules file 133X as there are structures B . . . J . . . M in template 131X. However, depending on input from user 183, there may be more rules or fewer rules in file 133X than the number of structures in a template. For example, user 183 may identify more than one action to be performed for a given condition, e.g. for a layout J structure, and the same user 183 may also identify no action to be performed for another layout structure M.

Additionally, depending on the embodiment, rules in two rules files 133X and 133Q (FIG. 1B) are selectively copied by a user into a common rules file 133R which the user then uses to invoke document analyzer 134 to analyze similar or identical layout structures that may be present in different types of word-processing documents 112A, . . . 112I . . . 112N. In an illustrative example, a table with the name "document metadata" is used in each of the following two different types of word-processing documents: functional design documents and user manuals, correspondingly created from two different templates 131X and 131Y and information in the "document metadata" table is extracted from both types of word-processing documents by a single invocation of document analyzer 134, by use of a common rules file 133R that has a single rule identifying in a condition therein the "document metadata" table. Accordingly, the number of rules in any one rules file 133X may or may not match the number of layout structures, in any specific template 131X.

Rules file 133X is manually viewed and if necessary modified by user 183, to ensure that one or more appropriate actions are associated with each layout structure J. For example, user 183 may overwrite a previously identified action associated with a specific identifier ID-J in rules file 133X by specifying a new action on link 155. Moreover, a condition in the rules in a file 133X need not identify a complete identifier or name (e.g. "document metadata" as noted in the previous paragraph) of a layout structure that is to trigger an action, and instead a wild card such as "*" or "%" can be used with a partial identifier, such as a portion of a name of the layout structure (e.g. "document meta*"). Rules file 133X is used by processor 120 executing document analyzer 134 when analyzing word-processing documents 112I . . . 112N generated based on template 131X, to determine an action to perform when a condition in a rule is found to match a layout structure in a document 112I. Therefore, execution of document analyzer 134 by processor 120 requires user 183 to select an action to be performed in rules file 133X and hence the type of data to be collected from each layout structure J, e.g. for storage in an RDBMS table or for display on a computer screen (i.e. computer monitor, such as a cathode ray tube).

Therefore, the output of processor 120 when executing document analyzer 134, such as the collection 135J and/or the statistics 136J, may be in different forms depending on the embodiment, e.g. web page 191 for use in a browser, spreadsheet 192 for use in a spreadsheet program, or relational database 138 that is accessed via a relational database management system (RDBMS) 1905, such as ORACLE DATABASE 11gR1 available from ORACLE CORPORATION. Note that each of web page 191, spreadsheet 192 and relational database 138 are present as files in a file system 190 that in turn is stored in a hard disk or other non-transitory storage media readable by a computer (i.e. any non-transitory computer-readable storage media).

The output of processor 120 when stored in an RDBMS table (such as table 138J) can be further processed by use of queries in a structured query language (SQL), to generate reports in the form of web pages for display by computer 184 to user 183. Hence, document analyzer 134 of some embodiments is a hosted (software as a service or SaaS) application that is invoked by user 183 providing a location (e.g. URL) of the document repository (where the group 115X of word-processing documents reside) and select a rules file 133X (instructions to document analyzer 134, as to what layout structures to look for in documents 112I-112N being analyzed (see group 115X in FIG. 1B), and what text and statistics to collect from each layout structure that is recognized in the documents).

Depending on the embodiment of the invention, there may be any number of rules files 133X . . . 133Q . . . 133R (see FIG. 1B), unrelated to the number of templates 131X-131Z. For example one user 183 may be interested in certain structures of template X and another user (not shown) may be interested in other structures of template X, and therefore the two users generate two rules files both originating from the same template.

When user 183 selects an action to be performed by processor 120 executing document analyzer 134 to use a relational database 138, user 183 also creates the necessary tables via link 156, e.g. an RDBMS table J identified as item 138J in FIG. 1B. Additionally, user 183 also updates in computer 100 via link 157, a property file 139 to form an association between RDBMS table J and a corresponding layout structure J (identified by its identifier ID-J) whose data is to be written into RDBMS table J by analyzer 134. In some embodiments, property file 139 is used to hold additional information (e.g. configuration) and therefore property file 139 is required by document analyzer 134 even if the document analyzer 134 has no ability to write data into an RDBMS table. In several such embodiments, property file 139 not only specifies relational database tables to store results of rules applied to corresponding layout structures, but also other processing logic such as 1) identification of what rule files are applicable to what templates and 2) environment configuration information etc. Note that identifier ID-J is also referred to herein as name of a layout structure, such as a TABLE_NAME or a SECTION_NAME depending on whether the corresponding identified layout structure (e.g. in a word-processing document) is a table or a section.

Supplying rules files 133X, 133Q and 133R and property file 139 as inputs to document analyzer 134 (FIG. 1B) enables a user 183 to obtain various types of data from a group of word-processing documents 115X by appropriately configuring files 133X, 133Q and 133R and 139. Specifically, document analyzer 134 is made user configurable because the user 183 can easily change an action or a layout structure in rules files 133X, 133R and 133Q and/or the tables in property file 139 which eliminates the need to write software code. For example, if a new layout structure (e.g. a new word-processing table) is to be processed, user 183 creates a new RDBMS table in database 138, adds an association between the new RDBMS table and the new layout structure's identifier (e.g. TABLE_NAME or SECTION_NAME) to property file 139 to generate a revised property file and adds another association between an action (e.g. extract data) and the new layout structure's identifier to a rules file to generate a revised rules file. Thereafter, document analyzer 134 is executed by processor 120 using the revised property file and the revised rules file as inputs. The just-described acts (in the current paragraph) are just configuration changes that are easily performed by user 183 who can do so (the current inventors believe) in at least an order of magnitude less time in human labor than manually modifying software source code of a prior art document analyzer to handle such a new layout structure.

Note that document analyzer 134 can be executed by processor 120 even without any data stored in relational database 138, e.g. document analyzer 134 is used to supply its output in a web page 191 (e.g. in HTML) and/or a spreadsheet file 192 (e.g. in a format called comma separated values or CSV) that can be opened by a software program called EXCEL available from MICROSOFT CORPORATION. Note that results in the just-described spreadsheet file 192 can be imported into a relational database by user 183 and then used to prepare reports by executing relational database queries in SQL (or structured query language).

Note that links 152, 153, 154, 155, 156 and 157 may be same as or different from one another and from link 151 (discussed above), depending on the embodiment.

In many illustrative examples, documents 112A-112N (FIG. 1B) are word-processing documents, and layout structure J (FIG. 1B) is a word-processing table in template 131X, and each row in the table J includes a message of text in a natural language that is to be displayed to human (such as an error message). In this example, table J in word-processing document 112I has q rows of messages, while the same table J in another word-processing document 112N has s rows of messages. Each of tables J is identified by a common predetermined identifier, such as the word "Messages" in both word-processing documents 112I and 112N. When analyzing word-processing document 112I by executing document analyzer 134, if the word "Messages" is found by processor 120 to be located immediately before a table, then processor 120 determines that table to be table J, and automatically copies q messages from that table J into collection 135J.

Similarly, when analyzing word-processing document 112I, if word "Messages" is again found by processor 120 it again automatically copies s messages from the table immediately preceding this word, and appends the s messages to the previously copied q messages in collection 135J. When analyzing a word-processing document, if a predetermined identifier in the rules file (e.g. name "Messages Table" in this example) is not found by of processor 120, it automatically forms an association in memory, between that document and that predetermined identifier, e.g. for use in an error message saying that the document does not contain the predetermined identifier.

Accordingly, when all word-processing documents 112I . . . 112N have been analyzed, collection 135J of this example includes the q+s messages that have been extracted from table J across multiple word-processing documents in the group 115X. In this example, statistics 136J for table J is a set of q+s counts, each count being the number of words of text in a message. The just-described output(s) of processor 120 (when executing document analyzer 134), namely the q+s messages and/or the q+s counts can be stored in non-transitory memory, and supplied to client computer 184 in a document such as a web page, a spreadsheet, or alternatively in an RDBMS table, for further use by user 183 in the normal manner.

In the above-described example, the q+s counts are added up to get a total count of the number of words in structure J across the multiple word-processing documents 112I and 112N, and used in estimating translation cost of the messages. If the translation cost is acceptable, the q+s messages are transmitted to a client computer of a human translator for translation from one natural language into another natural language. Examples of natural languages are languages that are written and spoken by humans, such as English, Dansk, Francais, Italiano, Nederlands, Poloski, Suomi, Espanol etc.

In the above-described illustrative example, two additional layout structures B and M in word-processing documents 112A-112N are also word-processing tables in template 131X, and each row in these two tables includes a name of a person. The persons in table B are authors and the word "Authors" is used as ID-B to identify table B in template 131X, while the persons in table M are reviewers and the word "Reviewers" is used as ID-M to identify table M in template 131X.

Hence, when analyzing word-processing document 112I, if the word "Authors" is found, processor 120 (while executing document analyzer 134) determines the immediately preceding table to be table B and automatically copies the author names identified in table B into collection 135B. Similarly, when analyzing document 112I, if the word "Reviewers" is found, processor 120 determines the immediately preceding table to be table M and automatically copies the author names identified in table M into collection 135M. Accordingly, each of collections 135B, 135J and 135M are incrementally formed, as each word-processing document 112I is analyzed. Thus, completion of analysis of a last word-processing document 112N in the group 115 completes the compilation of collections 135B, 135J and 135M.

Each of collections 135B, 135J and 135M organizes the user-input contents that are stored in structured form in word-processing documents 112I . . . 112N of group 115 in a manner that facilitates easy and quick review by user 183. For example, user 183 can review a collection 135J of messages to check for presence of any objectionable four-letter word, e.g. by opening the collection 135J in a browser and using the "search" function of the browser. Alternatively, performance of such a check can be automated by selection of an appropriate action to be performed in rules file 133. Moreover, user 183 can manually review the message collection 135J for conformance to grammar of a natural language. Therefore, by invoking execution of document analyzer 134 by processor 120, user 183 can efficiently validate the content and quality of word-processing documents 112I-112N (see group 115X in FIG. 1B). Hence, use of standardized document analyzer 134 significantly improves a software development organization's capability to produce high quality word-processing documents of different types, such as requirements specifications (BRDs) and/or functional design documents (FDDs) and/or user manuals (UMs).

As another example, user 183 can obtain a list of authors of word-processing documents 112I-112N by screening out duplicates from collection 135B, and obtain a list of reviewers by screening out duplicates from collection 135M. Furthermore, the number of times a person's name is duplicated is indicative of the amount of contribution by that person. Also, the number of rows with default sample text (or blanks) in collection 135J is indicative of the level of completion of documents 112I . . . 112N. For example in a word-processing document, if half of the rows are blank or have default sample text, then computer 100 may determine that the word-processing document is half complete, relative to another word-processing document in which all rows have default sample text (or blanks). Hence, in executing some embodiments of document analyzer 134, processor 120 automatically counts the number of rows that are blank or have default sample text, in response to user 183 specifying such counting in an action associated with the respective word-processing table J on link 152. Therefore, by using document analyzer 134, user 183 can efficiently evaluate the completeness of word-processing documents 112I-112N (see group 115X in FIG. 1B). The completeness of word-processing documents 112I-112N enables user 183 to set realistic expectations for downstream development processes, thereby enabling software development teams to collaborate more effectively.

Other such embodiments automatically count the number of times a person is identified as an author, by specifying such counting in an action associated with the respective table B. Still other embodiments automatically count the number of times a person is identified as a reviewer, by specifying such counting in an action associated with the respective table M. Hence, such counts constitute statistics 136B . . . 136M that can be used by user 183 as actionable intelligence (e.g. to set bonuses). In this manner, user 183 can use document analyzer 134 to review qualitative and quantitative characteristics of word-processing documents 112I-112N at individual document level or aggregate text and create statistics across many word-processing documents at various levels of hierarchy in a software product, and in a line (or suite) of software products. Specifically, various statistics can be produced by using document analyzer 134 to analyze word-processing documents across products, product families and lines of business in a manner that was not previously possible. In the absence of document analyzer 134, significant quality improvement opportunities are going unaddressed, due to limitations of existing document editors. With document analyzer 134, a user 183 can interpret and use the contents in word-processing documents 112I-112N in ways that weren't previously possible in just using a word-processor.

One example of software that is used to create word-processing documents 112A-112N and templates 131X-131Z is MICROSOFT OFFICE XP sold by Microsoft Corporation, which includes several different components that can be used to edit and create different types of files, e.g. the components: word-processing software called "Word 2002" for word-processing documents, spreadsheet program called "Excel 2002" for spreadsheets, and slide presentation program called "PowerPoint 2002" for slides. This example of software is an application program with multiple components normally installed in and executed by each computer 182I independently.

Another example of software to create word-processing documents 112A-112N and templates 131X-131Z is installed in and executed by a central server (e.g. computer 100) and made available as a service, to each of computers 182A-182N (i.e. software as a service or SaaS). Such word-processing software in computer 100 is accessed via a browser in computers 182A-182N. Hence, another example of word-processing software is the Google Docs office suite available from Google, Inc. The Google Docs office suite includes support for browsers in computers 182A-182N and 184 to access an on-line word processing service, in addition to on-line spreadsheet service and on-line slide presentation service.

In some embodiments, template 131X and word-processing documents 112A-112N are all created by use of the same word-processor (also called word-processing software) that includes a justification feature (left, center or right justification), a character formatting feature (bold, underline, italic formats), a spell-checking feature, a grammar checking feature, a word counting feature, a table insertion feature for inserting a word-processing table, and optionally a section insertion feature for inserting a word-processing section. The term word-processing software refers to a word-processor that is used to prepare business documents in the normal manner, such as WORD from Microsoft Corporation, and a word-processor of some embodiments lacks publishing features such as kerning and typesetting. Word processing software of such embodiments excludes publishing software, such as FRAMEMAKER, and ACROBAT both of which are sold by ADOBE SYSTEMS INCORPORATED.

One example of word-processing software is Word 2002 included in MICROSOFT OFFICE XP sold by MICROSOFT CORPORATION and an alternative example is WORDPERFECT sold by COREL CORPORATION. In such embodiments, the above-described insertion features, namely table insertion feature and section insertion feature may use styles to enforce consistency in formatting of words of text in a layout structure. In one example, layout structure J is a word-processing table normally maintained in a binary format used by the word-processing software (e.g. proprietary to Word 2002), and each row in the word-processing table J includes a message of text in the natural language, e.g. English. The words of text in tabular cells of a word-processing table J in each of documents 112A-112N are stored in a word-processing document (e.g. a MICROSOFT WORD document) in a file with the name "documentA.doc."

Use of document analyzer 134 enables the messages in word-processing table J of "documentA.doc" to be extracted and stored in an RDBMS table 138J, e.g. in a relational database 138 prepared by use of the software Oracle Database 11g Release 2 available from Oracle Corporation. Similarly names of authors in word-processing table B and names of reviewers in word-processing table M of "documentA.doc" are extracted and stored in two additional RDBMS tables 138B and 138M. Thereafter, when analyzing the word-processing document named "documentI.doc" each row of text structured by word-processing tables B, J and M in this document is extracted and inserted as a row into one of the respective RDBMS tables 138B, 138J and 138M. Note that database 138 of some embodiments includes another RDBMS table 138Z that holds statistics, and in one illustrative embodiment this table is shared across all templates and all layout structures in computer 100. After all word-processing documents in group 115X are analyzed, RDBMS tables in database 138 are analyzed with SQL queries to generate reports in the normal manner, and/or create new files (e.g. web pages) as would be readily apparent to the skilled artisan in view of this disclosure.

Hence, in the illustrative example described in the previous paragraph, use of document analyzer 134 provides at least the following advantages: (1) automated analysis of various types of word-processing documents (such as functional design documents, user manuals, product brochures, requirements specifications) for content quality and completeness (get accurate picture of deliverable readiness at a document level, across documents at a product, product family or lines of business (LOB) level); (2) content extraction for design reviews (significantly improves the speed and accuracy of design review by peers; some part of the review can be automated as well); (3) comparison of content from different word-processing documents across the software development life cycle (SDLC) phases to ensure feature completeness (for example user 183 can use a computer to ensure that "must have" features in requirements document were implemented in the functional design document); (4) create content repository for downstream use (for example build repository of product use cases from functional design document and insert that data into a quality center tool to automate test ware creation for quality assurance, improving accuracy of the test ware and reducing the cost significantly); and (5) intelligence collection from various types of word-processing documents (for example how many product use cases are there in a suite of software, how many features are in scope for a current version of the software suite, how many features were marked out of scope for the current version, etc.).

Note that although templates 131X-131Z are used in some embodiments of the type illustrated in FIG. 1B, in certain alternative embodiments of the invention no templates are used as illustrated in FIG. 1C. In several such alternative embodiments, users 181A-181C prepare word-processing documents 117A-117N (FIG. 1C) without any templates whatsoever. Word-processing documents 117A-117N are prepared in a manner similar to word-processing documents 112A-112N, and depending on the embodiment may even be identical to documents 112A-112N. However, note that word-processing documents 117A-117N are not standardized documents, because documents 117A-117N do not originate as copies of one or more of templates 131X-131Z. For this reason, documents analyzer 134 described above in reference to FIG. 1B is also referred to herein as a standardized documents analyzer (abbreviated as SDA), and documents analyzer 141 described below in reference to FIG. 1C is also to herein as a structured documents analyzer (also abbreviated as SDA).

Because in FIG. 1C there are no templates, user 183 manually reviews word-processing documents 117A-117N and identifies to computer 100 (either directly via a web page or indirectly via software executing in computer 184) a specific identifier of a layout structure (such as the table name of a word-processing table), and also an action to be performed by structured documents analyzer 141 (FIG. 1C), thereby to create rules file 133X. Rules file 133X in FIG. 1C is similar or identical to file 133X described above in reference to FIG. 1B. To select an appropriate action for transmission on link 154 (FIG. 1C), user 183 retrieves documentation 142 via link 158 from computer 100. Documentation 142 contains names of actions supported by documents analyzer 141 (FIG. 1C) and a description of the action (in a natural human language). Moreover, user 183 also identifies associations between each word-processing table and a corresponding RDBMS table in relational database 138, in a property file 139 in computer 100 as shown in FIG. 1C which is similar or identical to file 139 described above in reference to FIG. 1B.

Structured documents analyzer 141 of FIG. 1C operates similar or identical to standardized documents analyzer 134 of FIG. 1B, unless noted otherwise herein. Note that although in some embodiments, some information is stored in files (e.g. rules in rules file 133X, and configuration in property file 139) in a file system, in alternative embodiments the just-described information is stored in tables of a relational database (e.g. rules are stored in a rules table, and configuration in a configuration table, both tables accessed via an RDBMS).

In view of the above description of FIGS. 1A-1C, it will be readily apparent to the skilled artisan that documents analyzer 134 or 141 in accordance with the invention enables a user to quickly carry out analysis of documents by just preparing an appropriate configuration for operation of SDA 134/141 instead of writing new software. For example, use of SDA 134/141 eliminates the need for a user to prepare macros in word-processing software (e.g. WORD sold by MICROSOFT CORPORATION) to open and process documents 112I-112N (see group 115X in FIG. 1B). Furthermore, macros of the prior art in word-processing software typically record a position on a displayed page at which a certain action is to be performed, followed by another position at which another action is to be performed and so on.

In contrast to prior-art macros which are position-based, many embodiments of an SDA 134/141 in accordance with the invention does not use any pre-recorded position to perform its actions. Instead, several embodiments of an SDA 134/141 use a rules file that does not identify any positions of text on a page, i.e. the rules file is expressed in a "position-independent" format as described below. Use of a rules file 133X in a "position-independent" format enables SDA 134/141 to operate without performing calculation of position, e.g. along the x-direction (horizontal direction, from the left margin of a page) and y-direction (vertical direction, from the top margin of a page) before taking an action. Therefore, SDA 134/141 provides a generic solution for document analysis, by performing user-specified actions independent of positions of layout structures on a displayed or printed page. Note that SDA 134/141 is made generic by use of not only a position-independent rules file 133X, but additionally by use of a property file 139 that enables new word-processing layout structures to be mapped to new RDBMS tables created by the user in a relational database, without requiring the user to write any software code.

Furthermore, as discussed below, word-processing files having new file extensions (such as ".docy" and ".docz", both of which are madeup examples as there are no such extensions today) also can be processed by a single change to a list of file extensions used by SDA 134/141, making it even more generic. To summarize, SDA 134/141 can be used on any type of document (e.g. a functional design document is one type of document and a user manual is another type of document) which is an improvement over a prior art tool focused on doing just XML conversion from a binary format proprietary to MICROSOFT Word. Such a prior art tool is usually hard-coded to work only on one type of document, and in order to use this kind of tool with a new type of document requires the user to create a new DTD, create a new XML and write code to process new structures. In contrast, all that is needed for SDA 134/141 to handle a new type of document is a change to rules file 133X to specify new layout structures, without changing any software code of SDA 134/141.

Another unique feature of SDA 134/141 is that documents 112I-112N to be analyzed are prepared in the normal manner, by use of the most popular, industry-standard, word-processing software, namely MICROSOFT Word, which may use absolute positioning of text and/or images on a page. The only way known to inventors to analyze text in layout structures of documents in MICROSOFT Word format, prior to the invention of SDA 134/141, was to manually open the word-processing documents, one word-processing document at a time, which requires a human to manually take notes on each individual document and then manually compare the human-generated notes between documents, i.e. needs human intelligence.

In several embodiments, SDA 134/141 is programmed to support several different types of actions, to be performed when a rule in rules file 133X matches a layout structure in a document 112I. Note that rules file 133X typically holds multiple rules. In some embodiments, each rule in rules file 133X is associated with only one action which is selected by a user, from among 10 different actions to choose from, such as extract table data, check empty table fields, etc). In such embodiments, each rule also has many parameters (some mandatory, some optional) to flexibly specify any layout structure, context data, etc. Examples of the three actions that can be specified to be performed by SDA 134/141 are (a) searching limited to only that text which occurs within a layout structure specified in a rule (also called "contextual search"), (b) check if that text (within the layout structure) meets a user-specified condition, such as accuracy and/or completeness, (c) copy and store in memory, that text (from within the layout structure) in a relational database, for use in answering queries in SQL across documents that are similar to one another (e.g. all of which may have been created from a common template).

Examples of such actions are now described in reference to a document 112I prepared from a template illustrated in FIG. 2A (which is described in further detail, in subsequent paragraphs below). In these examples, a specific layout structure is identified in word-processing document 112I as a word-processing cell, with a heading 211B in a row having the string value "Author", in a table 210 identified by table identifier 213 having the string value "Document Metadata." Whenever such a cell is found (e.g. cell 212B in FIG. 2A) in document 112I, an example of the above-described action (a) is to check if the string "Anish" is present therein (to identify documents in which Anish is named as an author); an example of the above-described action (b) is to check that this cell is not empty and does not contain a default text string from the template "<First Name Last Name>" and but if it does then to log a message in computer memory; and an example of the above-described action (c) is to copy and store in memory the text string found in this word-processing cell, into a column named "Author" in an RDBMS table that has as another column named "File Name" (holding a file name and file extension of document 112I).

Note that any one or more of the above-described actions (a)-(c) are performed by SDA 134/141 only after table 210 that is identified by the identifier "Document Metadata" is found in document 112I, and then too only on that cell whose header contains the user-specified string (in this example "Author"). For example, if in a document 112I, there happen to be three rows in table 210 all of which have the same user-specified string in their header (in this example "Author"), then the same above-described action is performed by SDA 134/141 on the text within each such cell in table 210, because the rule is triggered three times (by the three rows each of which has the header "Author" in this example). Accordingly, a document 112I that identifies three authors is processed correctly because SDA 134/141 is designed (as described herein) to apply rules (specified in a rules file 133X) that identify a layout structure specified by the user (e.g. by comparing sequences of tags or text strings), instead of identifying a position in a page.

Accordingly, the current inventors believe two unique aspects of SDA 134/141 are as follows: (1) SDA 134/141 enables users to process existing and new templates built with word processing software and process a repository of documents based on the above processed templates, without code changes, and (2) SDA 134/141 allows users to dynamically capture different data structures in a relational database, again without code changes. Instead of code changes, the user of SDA 134/141 merely makes configuration changes, which is significantly simpler and easier to do than making code changes.

In many embodiments of the type described above, SDA 134/141 provides a unique end-to-end solution that enables users to unlock the data and intelligence—previously only accessed at individual word processing document level—across several word processing documents to gain operational, procedural and process efficiencies. To the knowledge of the current inventors, such an end-to-end solution has not been achieved at any software companies (or any other companies utilizing functional design documents, product brochures, user manuals, or any other type of documents). To the knowledge of the current inventors, nobody has done a solution to extract intelligence, by analyzing a set of documents as a whole instead of manual review of a single document. The current inventors recognized, understood and overcame several challenges in developing such end-to-end solution that no one else has been able to do, as discussed next.

Four illustrative examples of challenges recognized by the current inventors include: C1: Ability to deal with large size and content of documents containing diagrams while attempting to convert such documents from proprietary format to generic text format. C2: Ability to analyze and process documents containing different structure and content without writing new code to handle each type of structure and content. Any solution incapable of dealing with this issue would not be scalable or acceptable for generic use. C3: Ability to handle user requirements from different users on same structure and content in any type of document (examples of different types of documents are: functional design document, requirements specification, user's manual, product brochure, etc). For example, one user would be interested in counting words in the cell of a table in word processing document while other user might have a need to ensure that certain text is included in the same table cell. Addressing the need of different users in a generic solution (a solution that does not require changing code) has been a big challenge till now. C4: Performing complex analytics on the content of various types of word processing documents in a single solution. While certain analysis can be performed at a document level, more complex analysis on data collected from several types of documents needs to be performed by collecting data into a database. However, providing ability to capture different structure of data from word processing documents into an RDBMS database without changing code has been another major challenge not addressed by any prior solution known to the inventors.

To overcome the above-described challenges C1-C4, the current inventors combined their years of computer development experience with several different technologies to come up with a generic solution. Following is an overview of some of the creative innovations that addressed above challenges: I1: Identify and eliminate images in the native format of the document before converting the document into a generic text format, such as XML. I2: Provide ability for users to specify the content and structure of interest in any type of document as an input to SDA 134/141 by using a simple user interface that does not require user to understand the proprietary word processing document format or any other technical knowledge. Using this mechanism, users can specify the information of their interest by the type of documents they wish to process. This capability is described as rules generator and rules file in subsequent sections. I3: The same capability described in innovation I2 above also enables users to specify type of action (extract data, count words in a table cell, check for default text in table cells etc.) they wish to perform on a specific structure and content in a particular type of document. The challenges C2 and C3 described above have been, in the view of the current inventors, the biggest hurdle that has prevented prior attempts from succeeding. Using an innovation implemented as a rules generator and a rules file, the current inventors have successfully provided a solution for these challenges. I4: To overcome the challenge C4, the current inventors provided an ability for users to specify a mapping between each word processing document structure and a corresponding RDBMS structure (also known as an RDMBS table) in a text format, e.g. as a property file 139 that is input to SDA 134/141. Use of a text format for the property file enables a user to make any changes necessary to the mapping information using any simple text editing tool. SDA 134/141 then interprets and consumes the mapping information, in text form from the property file 139, and performs the operation to extract text from the word-processing table and store the extracted text into a RDBMS table, as described herein.

Additional illustrative examples of challenges recognized by the current inventors and their solutions include the following. H1: Handle new templates. It is easier to only support existing templates, which in the prior art is a "hardcoded" solution for restricted scenarios, such as well formatted parent document, etc. No one knows what layout structure will be used in a new template, in what format, and in what order. Making SDA 134/141 smart enough to analyze any new word based template structure, and then matching to any documents that's based on the template is very challenging. The current inventors' solution is to use rules, stored in a Rule Files and applied by an engine in SDA 134/141 and created by a Rule Generator. H2: Handle any user documents based on templates. Even when based on a template, actual user documents can have various contents that change the initial structure copied from the template, or even invalid format that prevents the document to be opened properly or converted into other formats. Extracting good content, and reporting violations is another good challenge. The current inventors' solution is to capture all exceptions for reporting. In all cases, processing continues until the last document is finished. H3: Handle multiple versions of the same templates. New table or cell names may be used to refer to the same data elements in an old template. Table fields may be deleted/updated/added. All these need to be intelligently reflected and linked together in the database output repository. The current inventors' solution is to use a property file to link old and new names. Maximum table definition to contain super set of all columns of a table in all template versions.

More illustrative examples of challenges recognized by the current inventors and their solutions include the following. H4: Handle a repository of documents, and intelligently identify: documents that are not based on any template, documents based on template but not in sync with the template and rule selected, document largely based on template but user has various contents that's violating the template. The current inventors' solution is to use exception handling and reporting. SDA 134/141 intelligently filters out all documents that are not based on a user-selected template, only processes the generally good documents, only generate results from good content, and reports exceptions at system, document and content levels. H5: Handle arbitrary database repository. No one knows what data elements a new template and their documents will contain. Analyzing the documents and store the result to database is a big challenge, as to how to organize the huge amount of dynamic data in order for easy reporting. The current inventors' solution is to use a property file to connect data elements in documents and tables in database. H6: Handle large volume of data content in complex format, as document repository can have gigabytes of data with complex structures and elements such as nested tables and large images (see C1 & I1 discussed above), and the use of computer memory can be indefinite. The current inventors' solution is to program SDA 134/141 to identify and remove all images before processing, which reduces memory usage significantly, makes bulk processing possible, and generate clean result. SDA 134/141 also identifies complex structure, and either processes it or reports it, but SDA 134/141 keeps crawling the entire repository and generates one result at the end.

Figure 2A:
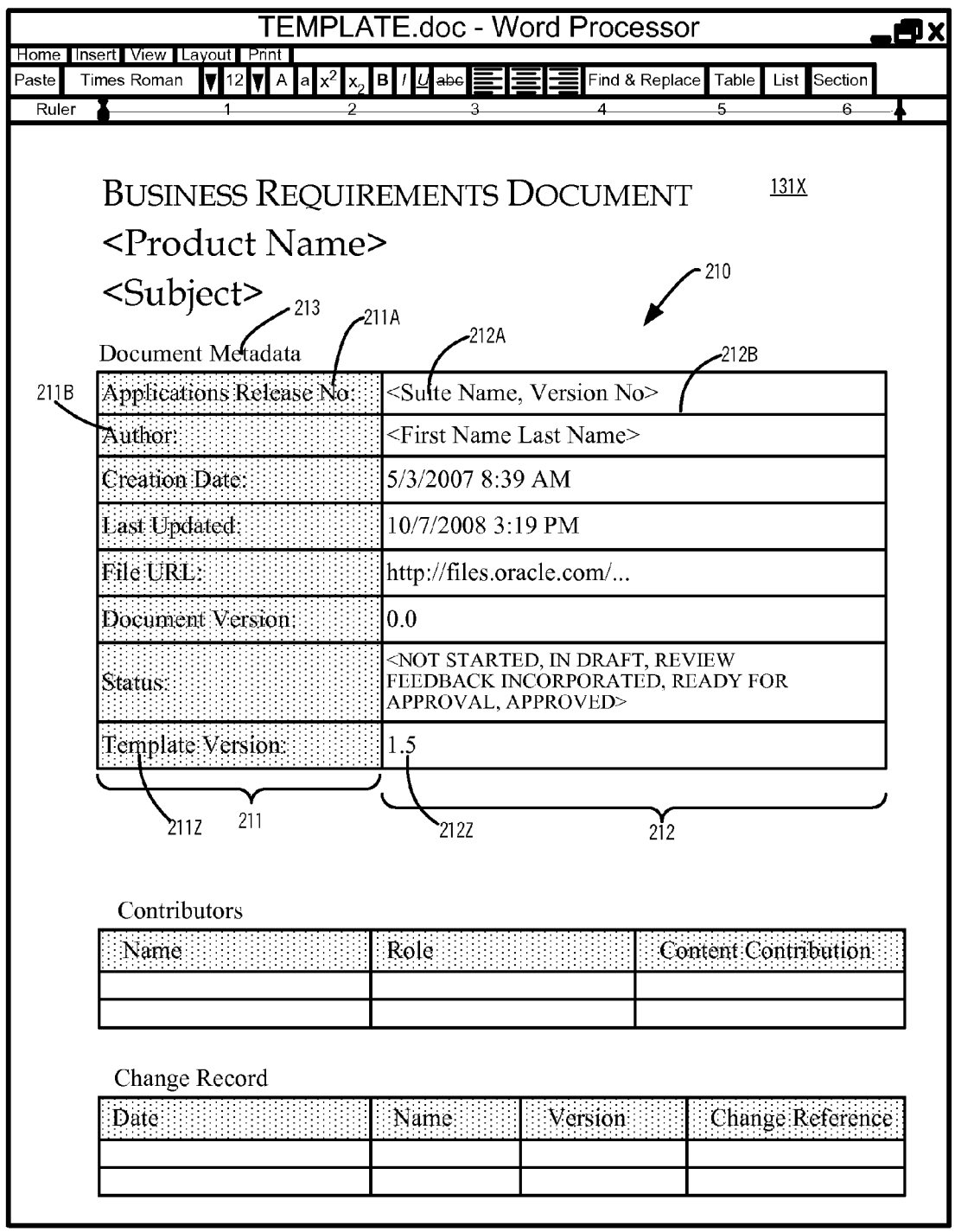
FIGS. 2A and 2G illustrate a display on a computer screen, of a template of the type illustrated in FIG. 1B, in some aspects of the invention.

FIG. 2A illustrates a screen of a word processor in which an example of template 131X has been opened. In this example, template 131X includes a word-processing table 210 that has two columns 211 and 212. Column 211 has a number of headings (also called "row headings") 211A-211Z arranged vertically relative to one another. Note that in this example, row heading 211A is at the top and row heading 211Z is at the bottom of column 211. Column 212 has sample text 212A at the top of the column, located in the first row and adjacent to row heading 211A. Moreover, column 212 has sample text 212Z at the bottom of the column located in the last row and adjacent to row heading 211Z. In this example, word-processing table 210 is a vertical table because row headings 211A-211Z are arranged vertically in table 210 and separated from one another by contents in the rows of table 210.

In this example, a string of text (also called "table identifier") 213 occurs immediately before word-processing table 210. This string 213 has a semantic relationship with word-processing table 210 due to their respective locations relative to one another, that is readily apparent to human users 183 and 181A-181N but that semantic relationship is not known to the word-processing software. Specifically, the relationship is that string 213 is an identifier of word-processing table 210 as seen visually by human users due to physical proximity to one another. Accordingly, when template 131X is used to create a document 112A (see FIG. 2B) by user 181A, a string 223 that is occurs immediately before table 220 in the sequence of text in document 112A is kept identical to string 213 that identifies table 210 in template 131X. The row headings 221A-221Z in document 112A are similarly kept identical (by human users 181A-181N) to corresponding row headings 211A-211Z in template 131X. The input of human user 181A is used to insert text 222A-222Z in table 220 by overwriting the sample text 211A-211Z in template 131X.

Figure 2C:
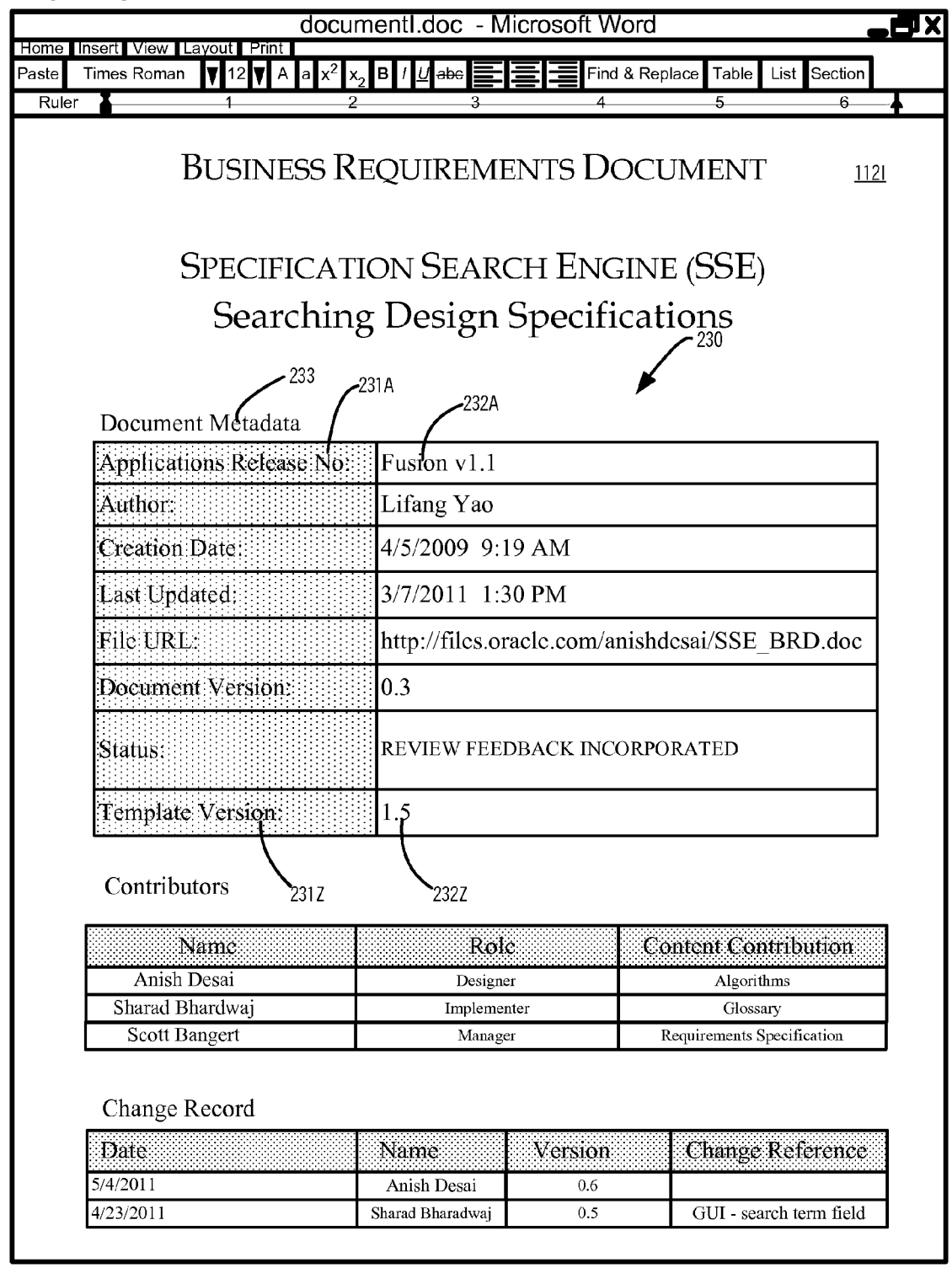

Similarly, the input supplied by user 181I is used to insert text 232A-232Z in table 230 of document 112I (see FIG. 2C) by overwriting the sample text 211A-211Z in template 131X, while string 233. In document 112I, the row headings 231A-231Z as well as the string 233 are all kept identical to corresponding row headings 211A-211Z and string 213 in template 131X. Document 112N (see FIG. 2D) is also created in a similar manner by use of the input of user 181N. Note that in the example shown in FIGS. 2A-2F and 2K, the word-processing software is Word 2002 sold by MICROSOFT CORPORATION.

FIG. 2E illustrates a rules file 133 in an extensible markup language (XML) generated by a rules generator 132, using template 131X shown in FIG. 2A. Specifically, rules generator 132 includes a string of text 251 in rules file 133 identical to the text string 213 that happens to be adjacent to and immediately preceding table 210 in template 131X. Text string 251 is identified in parsing rule 250 by rules generator 132 as a table name for table 210. Moreover, a row heading 211A in template 131X (FIG. 2A) is identified by rules generator 132 as a name 252 (FIG. 2E) of a cell in the table 210. Similarly additional row headings of table 210 are also included by rules generator 132 in parsing rule 250 as shown in FIG. 2E.

Rules generator 132 also includes in parsing rule 250, an orientation direction 259 in which cell headings are arranged in table 210. Examples of orientation are HORIZONTAL, VERTICAL, COMPLEX_HORIZONTAL and COMPLEX_VERTICAL as follows: HORIZONTAL (meaning, the first row are headers, followed by multiple rows of data), VERTICAL (meaning, the first column are headers, and 2nd column are data). Tables in a document can also be COMPLEX_HORIZONTAL and COMPLEX_VERTICAL as described below.

Therefore, when orientation direction 259 of a table layout structure is HORIZONTAL, document analyzer 134 processes the table one row at a time, starting with using the text in the first row as headers, and then processes text in remaining rows of the table layout structure using one or more actions identified by the parsing rule 250. When orientation direction 259 is VERTICAL, document analyzer 134 similarly processes the table one column at a time. However, when orientation direction 259 of a table layout structure is COMPLEX, document analyzer 134 does not process the entire complex table as one item. Instead, document analyzer 134 breaks the table into the HORIZONTAL and VERTICAL sub tables, and these sub tables are then processed in the same way as normal HORIZONTAL and VERTICAL tables described at the beginning of this paragraph, after defining attributes in computer memory, to be used to assemble the whole table data after all sub tables (of the complex table) are processed.

Therefore, in some embodiments, a complex word-processing table contains both horizontal and vertical sub tables, and the document analyzer uses a divide-and-conquer approach to obtain the data in each horizontal or vertical table, and then assembles the obtained data using common parent keys or other context data. When referring to a horizontal sub table, it is referred to as COMPLEX_HORIZONTAL, meaning, a horizontal sub table in a complex table. Similarly, a COMPLEX_VERTICAL means a vertical sub table in a complex table.

An example of a complex table is as follows:

Detailed Error Conditions and Messages
Repeat table for every detailed error condition and corresponding message(s) that need to be defined.

| Business Rule ID | Error Condition | Actionable Preventable | by End User | Diagnostics |
|---|---|---|---|---|

Messages (repeat the rows below, including Tokens, for each message)

| Type | Message Category | Message Severity |
|---|---|---|
| Error | Product | High |
| Warning | System | Medium |
| Confirmation | Security | Low |
| Processing | | |
| Information | | |
| Message Name | | |
| Message Text | | |
| User Message Detail | | |
| Admin Message Detail | | |
| Cause | | |
| User Action | | |
| Admin Action | | |
| Translator Notes | | |

Tokens (repeat the rows below for each token)

| Token Name | Token Type | Token Description |
|---|---|---|
| | Date | |
| | Number | |
| | Text | |

Moreover, parsing rule 250 is prepared by rules generator 132 to include a user-selected action identified by string 258 which in this case is "EXTRACT_TABLE_DATA." Hence, this action (namely EXTRACT_TABLE_DATA) is to be automatically performed by processor 120 (when executing SDA 134) when the table 210 is determined to be present in a document 112I that is being analyzed. Note that rules file 133 (FIGS. 2E and 2F) does not identify any physical dimension of table 210 in the parsing rule 250. Therefore, discussed above, certain of these actions applicable to a table are shown in a drop-down list box 282, for selection by a user):

| ACTION_TYPE | Action Scope | Result |
|---|---|---|
| CHECK_SECTION_EXISTENCE | SECTION | It checks if a document has the specified section name in the section hierarchy. |
| EXTRACT_SECTION_DATA | SECTION | It extracts the text from the specified section |
| EXTRACT_TABLE_DATA | TABLE | It extracts specified table data. |
| COUNT_TABLES | TABLE | It counts total number of instances of VERTICAL or COMPLEX_VERTICAL table structure throughout the document. |
| COUNT_TABLE_ROWS | TABLE | It counts total number of rows in each instance of HORIZONTAL or COMPLEX_HORIZONTAL table structure throughout the document |
| COUNT_EMPTY_TABLE_CELLS | TABLE (cell level) | It counts total number of table cells that are mandatory to have data but empty |
| COUNT_TABLE_CELLS_UNDER_CONDITION | TABLE (cell level) | It specifies the CELL_VALUES that a CELL_NAME can have, and group document data into those values, including valid and invalid values |
| COUNT_WORDS_IN_TABLE_CELL | TABLE (cell level) | It counts total number of words in specified table cells. | users 181A-181N can change physical dimensions of individual cells in table 210 or even the position of table 210 as a whole, e.g. relative to the left margin and/or top margin of a page, without in any way affecting the operation of SDA 134, as described next.

Specifically, in some embodiments of the invention, tables or table cells can be changed in their physical location in terms of margins and moreover they can be placed anywhere in a document as long as the layout structure and its identifier are maintained in a predetermined sequence relative to one another. Moreover, there can be multiple occurrences of the same layout structure, and all occurrences result in the corresponding action being performed, and results of the action captured. With a table, the order of headers of columns or rows can be switched relative to one another, for example, a word-processing table in one document can have two columns of names, Age, Gender while the same word-processing table in another document can have three columns of names Gender, Name, Age and even so the document analyzer still captures the data from an identified column, regardless of its position in the table.

FIG. 2I illustrates a screen displayed by computer 184 to user 183 to receive user input selecting an action to be performed on a layout structure. Specifically, in FIG. 2I a table 210 in template 131X (FIG. 1B) is displayed. When the user 183 moves their mouse so that a cursor 281 hovers over table name 213, then a drop-down list box 282 is displayed. User 183 can then move their mouse so that cursor 281 selects one of the elements in list box 282. Each element in list box 282 is an action that can be performed on table 210, by processor 120 executing standardized document analyzer 134. Rules generator 132 processes such user input to prepare rules file 133X, by associating user-selected action (e.g. EXTRACT_TABLE_DATA) with an identifier of table 210 (e.g. Document Metadata). Note that the set of actions shown in box 282 are different for a layout structure that is a section, because actions applicable to a section are different, such as actions CHECK_SECTION_EXISTENCE, and EXTRACT_SECTION_DATA, described below.

Examples of actions supported by standardized document analyzer 134 are shown in the following table (and as In addition, TABLE_NAME and SECTION_NAME attributes are also included in a rules file 133X to indicate which layout structures are relevant, and will be analyzed by processor 120 (when executing SDA 134). In case of a TABLE layout structure, note that the names of cells are also included in the rules file 133X as CELL_NAME attributes of the TABLE, for use by SDA 134 to perform cell level actions, such as COUNT_EMPTY_TABLE_CELLS. Sample output generated by SDA 134 is shown in FIG. 2J.

FIG. 2K illustrates an alternative screen displayed by computer 184 to user 183 to receive user input selecting an action to be performed on a layout structure. User input in top frame 291 is a template, and in response rules generator 132 parses through the template, captures the section hierarchy, identifies whether a section has table structure, and displays this information on the left frame 292. In the left frame 292 the user may choose any section to define rules. In the right frame 293, the user sets up rule attributes for a selected section. Depending on whether a section has table layout, the attributes available to setup the rules are different. If no table exists, only SECTION rules and corresponding attributes are available for setup. If there are table in the section, all rules will be available for setup. If user wants to setup a rule for a table, the user chooses the table format after visually looking at the template. If the rule is at table field level, all table fields are available to choose from. It has all the other attributes that are needed to generate rules. Once done with one rule setup, user clicks Add Another Rule to setup a new rule for the same section. In the bottom frame 294, after all rules are setup for all sections, clicking this button generates a XML file with all rule definitions. This rule file is transmitted to computer 100, ready for use by SDA 134.

In some aspects of the invention, rules generator 132 and the document analyzer 134 are implemented to support the following features. All the rules are applicable to any existing or new templates, or existing and new versions of the same template. The documents 112I-112N (FIG. 1B)

based on those templates are analyzed by document analyzer 134 without requiring any code changes to document analyzer 134. Moreover, all rules are in the context of a Section Hierarchy of a word-processing document.

Moreover, in certain embodiments, document analyzer 134 is responsive to additional attributes that are applicable to a Section Hierarchy to generate context sensitive and more targeted results. Specifically, a user can specify the attribute PARENT_SECTION_NAME to limit the scope of analysis by document analyzer 134 to only layout structures that occur under that section in document 112I. If no value specified for this attribute, it means document analyzer 134 analyzes layout structures throughout the document 112I. For example, the user can have an Overview table under the following two different parent sections: "Features in Scope" section and "Features out of Scope" section. If the user only wants to collect the Overview data for Features in Scope, the user can set Table_Name='Overview' and PARENT_SECTION_NAME='Features in Scope'. Another example, if the user has multiple copies of an Error Message table throughout the document 112I, e.g. in all sections, and the user may want to know all error messages regardless where they are used, in which case the user ignores this attribute PARENT_SECTION_NAME so it takes the default value, which is whole document.

Similarly, in several embodiments, a user can specify to document analyzer 134 another attribute DATA_LEVEL to indicate how many levels down into the data in document 112I the user is interested, from the given starting point. For example, in a Section Hierarchy, there may be different TABLE structures at each level. It is possible that all these table structures have some common columns, such as Name, or Description. Using DATA_LEVEL, the user can request document analyzer 134 to either return only certain levels of data in the result, or all levels. Moreover, in some aspects, all TABLE rules support filters so that empty or invalid records can be captured to report exceptions, or can be excluded to get the actual count. Also, in several aspects of the invention, the document analyzer 134 takes in all the rules as one input, and several documents as another input, processes the documents with the rules, and generates a single result for all rules applied to all documents.

Figure 2G:
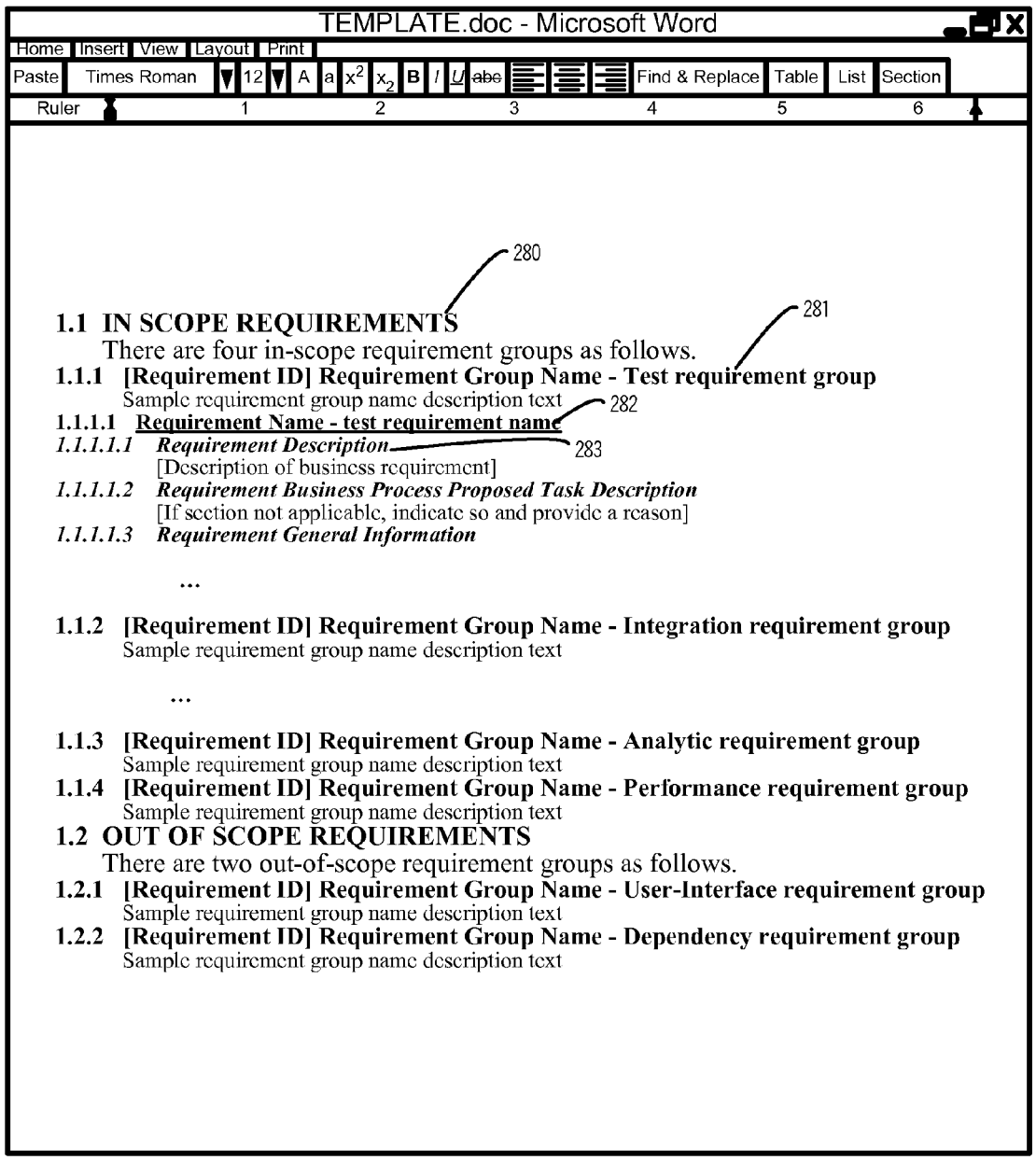
Figure 2J:
FIG. 2J illustrates, in a display on a computer screen, a web page output generated by a documents analyzer, in some aspects of the invention.

Although the above discussion in reference to FIGS. 2A-2E (and 2F) has been focused on word-processing tables as layout structures, it is possible for a template to include a hierarchy of sections as a layout structure as illustrated in FIG. 2G. Moreover, FIG. 2H illustrates a rules file that is created by invoking rules generator 132 with the template in FIG. 2G. Rules generator 132 of some embodiments is implemented in a computer to perform the acts illustrated in FIG. 3A. Depending on the embodiment, rules generator 132 can be implemented wholly in server computer 100 or wholly in client computer 184 or partially in each of computers 100 and 184. For illustrative purposes in the next three paragraphs, computer 100 is described as executing rules generator 132 to perform the method illustrated in FIG. 3A.

Specifically, in act 301 (FIG. 3A), the name and location of word processing template 131X is received and computer 100 then goes to act 302. In act 302, computer 100 checks if the template is in a binary file format that is proprietary to the word-processing software, such as Word 2002 sold by MICROSOFT CORPORATION. For example, in act 302, computer 100 checks if the file extension of the template ends in ".doc" or ".docx" and if so determines that the answer in act 302 is yes and hence goes to act 303. Note that in addition ".dot" extension can also be used as just described, in other embodiments. In act 303, computer 100 converts the template, by using a feature (e.g. macro) in the word-processing software (which created the template), into a rich format expressed in a markup language readable by humans, enabling text documents in this format to be used by different word-processors across different platforms ("interoperable format"). The interoperable format can be different in different embodiments, and in the above-described example, wherein the word-processing software is Word 2002, the interoperable format is the Rich Text Format (RTF) published by MICROSOFT CORPORATION.

If the template is already expressed in a human-readable markup language, then the answer in act 302 is no and therefore act 303 is skipped and computer performs act 304. Act 304 is also performed after completion of act 303. In act 304, computer 100 converts the template (e.g. now in the RTF format) into another markup language for displaying pages and having no semantic markup, e.g. the Extensible Stylesheet Language for Formatting Objects or "XSL-FO." XSL-FO is a part of the XSL specification defined by W3C e.g. available on the Internet at http://www.w3.org/TR/xsl11/. For additional information, see Chapter 18 of the XML Bible, Second Edition, entitled "XSL Formatting Objects" by Eliotte Rusty Harold, 2001 available at http://www.cafeconleche.org/books/bible2/chapters/ch18.html, which is incorporated by reference herein in its entirety.

An example of conversion of the template of FIG. 2A into the XSL-FO format is illustrated in FIGS. 4A-4D. In this example, the software BI PUBLISHER 11g available from Oracle Corporation is used to perform the conversion in act 304 although any other such software can be used depending on the embodiment. Note that after the just-described conversion, there are numerous properties in the XSL-FO file as shown in FIG. 4A, such as margin-left="30.6pt" margin-right="30.6pt" page-height="792.0pt" page-width="612.0pt" margin-top="21.6pt" margin-bottom="36.0pt. In contrast, there are no dimensions in rules files 133X as illustrated in FIG. 2H, which is therefore in a "dimensionless" format. There are also no positions in rules files 133X.

Next, in act 305, computer 100 parses the template (now in the XSL-FO format) to identify the text strings that precede one type of layout structures, namely tables and determines them to be table names. Similarly, in act 305, computer 100 also determines the text strings in styles of another type of layout structures, namely sections heading to be section names. Next, in act 306, computer 100 associates an action selected by a user (e.g. as shown in FIG. 2K or 2I) for each table and for each section. The action selected in act 306 can be, for example, to extract the text in the cells of each table and to check for existence of text in each section. Thereafter, the identifiers and the associated actions are written into computer memory in act 307 as a rules file 133X, which in some embodiments is expressed in a dimensionless format, e.g. in XSL. As noted above, a dimensionless format does not use any dimensions normally used in laying out a document on a computer screen or on printed paper, such as font size, distance from left margin, distance from right margin.

Figure 3A:
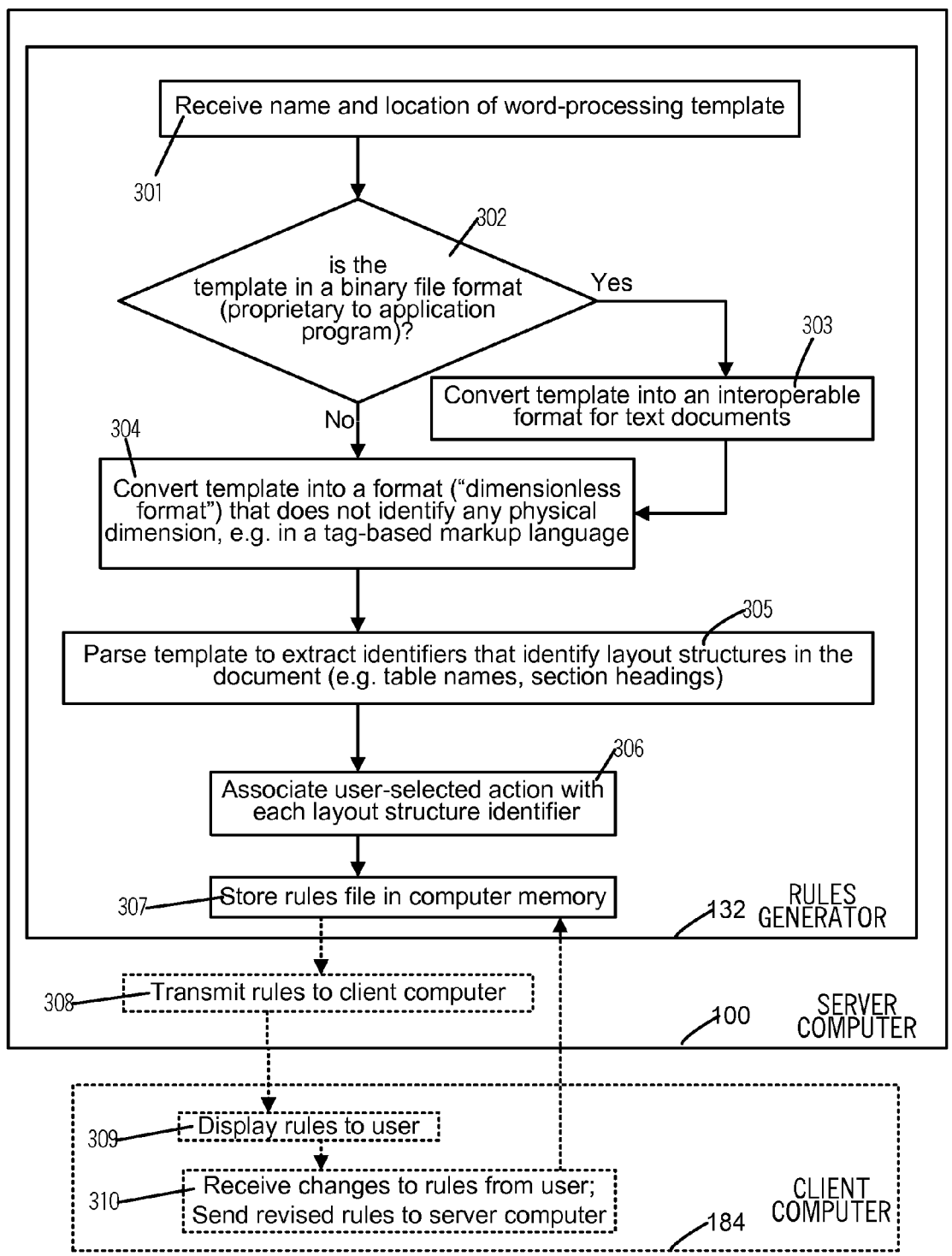
FIG. 3A illustrates, in a flow chart, a method performed by a rules generator 132 which is executed by a server computer 100 of FIG. 1B in some embodiments of the invention.

In some aspects of the invention, rules file 133X is additionally transmitted by server computer 100 to client computer 184 as illustrated by an optional act 308 in FIG. 3A. In such aspects of the invention, rules file 133X is then displayed to user 183 in act 309 by computer 184. User 183 may modify one or more rules, e.g. by using word-processing software in client computer 184. Any changes from user 183 are received by computer 184 in act 310 and transmitted to server computer 100. Computer 100 stores the user-modified rules file 133X as in act 307, for use when executing document analyzer 134 (as described above).

Figure 3B:
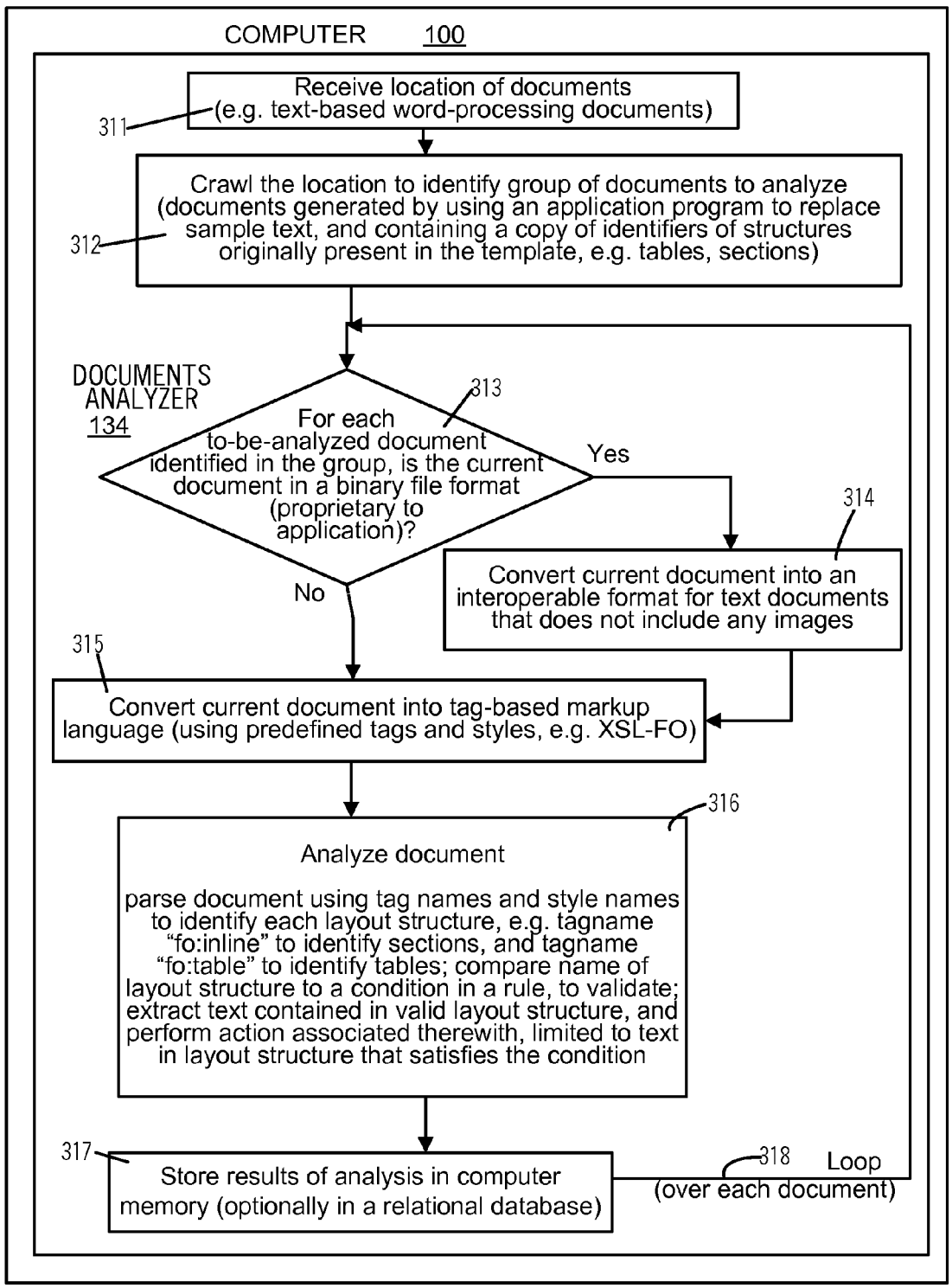
FIG. 3B illustrates, in a flow chart, a method performed by a document analyzer 134 which is executed by a server computer 100 of FIG. 1B in some embodiments of the invention.

Note that in the following description, reference to document analyzer 134 is to be understood to mean the execution of document analyzer 134 by computer 100. Document analyzer 134 of some embodiments performs acts that are illustrated in FIG. 3B, which unless described otherwise below are similar or identical to acts described above in reference to FIG. 3A. Specifically, in act 311, document analyzer 134 receives an identification of a location (e.g. any URL that is publicly accessible on the Internet, or on an internal website of a corporation) at which are stored a group of documents to be analyzed. The just-described location identification is received from a user, e.g. via a screen of the type illustrated in FIGS. 3C and 3E.

At the user-specified location is present a repository that holds the group of documents 112I-112N that are to be analyzed, which have been generated by users 181I-181N (FIG. 1B), as noted above (specifically, by users providing keyboard and mouse input to document editing software such as the word-processing software Microsoft Word, in order to replace sample text (or blank text) in template 131X with the user's custom text). Hence, in a next act 312, document analyzer 134 crawls the user-identified location received in act 311, so as to find each of the documents 112I-112N that is to be analyzed and then transfers each document into server computer 100 (from a repository at the user-identified location).

Therefore, in an illustrative embodiment, in act 312, document analyzer 134 connects with a file server or other repository at a user-specified location, and then transfers each file to a local memory in computer 100, such a hard disk that is within computer 100 or accessible to computer 100 via a local area network (LAN). In some aspects of the invention a file transfer is done using a generic protocol, such as the File Transfer Protocol FTP, to transfer each of documents 112I-112N from the user-identified location to a non-transitory computer readable medium that is included within computer 100.

After act 312, document analyzer 134 enters into a loop, for each document to be analyzed as a current document. Specifically in act 313, document analyzer 134 checks if the current document is in a binary format (e.g. by checking if the file name extension of a file at the user-specified location is ".doc" or ".docx"), and if so goes to act 314 to convert the current document into an interoperable format as described above. In some aspects of the invention, file name extensions are checked to be one of ".doc", ".docx" and ".rtf" prior to file transfer by FTP from user-specified location to a non-transitory memory located within or accessible to server computer 100, and only those files that have one of these extensions are transferred to computer 100.

In one such example, files 112I-112N (see group 115X in FIG. 1B) having ".doc" and ".docx" extension are in a binary format proprietary to MICROSOFT Word, and in act 314 these files 112I-112N are converted to a rich format, such as the Rich Text Format RTF. The rich format enables the document to be transferred between word-processors, and hence it is also referred to as an interoperable format. In some aspects of the invention, in act 314, document analyzer 134 checks if the document's extension is not ".rtf" and if so (which is true when the file extensions are ".doc" traditionally, and ".docx" recently-introduced), then computer 100 performs a conversion into RTF.

Note that in some aspects of the invention new file extensions can be added without impact to the code of document analyzer 134, e.g. if MICROSOFT CORPORATION introduces new extensions in future such as ".docy" and ".docz" (which are made-up examples, as no such extensions currently exist today) then files with these extensions are processed in act 313 after simple configuration changes, without any impact on the code of document analyzer 134. After act 313, document analyzer 134 goes to act 315 from act 314. Document analyzer 134 also goes to act 315 from act 313 if the answer is no.

Note that in act 314, document analyzer 134 removes all images from the current document and then converts the current document into RTF. In act 315, document analyzer 134 converts the RTF document into a tag-based markup language XSL, e.g. using the XSL-FO format (described above) and then goes to an operation 316, described below. Note that acts 311-315 are performed independent of (and without knowledge of layout structures). Removal of images in act 314 improves performance of document analyzer 134, both in terms of the amount of memory used and the amount of time to process document. The just-described improvements in performance make it possible for document analyzer 134 to be used in "bulk" processing, i.e. to analyze a group 115X of documents 112I-112N that are an order of magnitude (e.g. 10 documents) or more larger in number, relative to single document being analyzed (e.g. 1 document). Note that removal of images changes positions of various layout structures in a document 112I, but as positions are not used by document analyzer 134 to apply rules to identify actions to be performed, this change (removal of images) improves the performance of document analyzer 134 sufficiently for its use in bulk processing.

Note that operation 316 is summarized in this paragraph, and details of an illustrative implementation of operation 316 are shown and described in reference to FIG. 3C as described below this paragraph. In operation 316 (FIG. 3B) document analyzer 134 parses the current document to find each layout structure that is valid, which is recognized in some embodiments using tag names and/or style names resulting from act 315. For example, the tag <fo:Table> is used to identify those preceding words of text that have a predetermined style (e.g. the style-name="Table Heading"), as a name of the layout structure, in this example the table name. Note that any amount of additional text may intervene between the layout structure's name and the layout structure itself, as long as such additional text has a different style from the predetermined style used for the name. On finding a layout structure, document analyzer 134 extracts text contained in the layout structure, and then checks if that extracted text satisfies the condition of any rule, in the rules file 133X (which is received as input to document analyzer 134). Whenever a rule's condition is satisfied, document analyzer 134 determines that the layout structure is valid and therefore performs an action associated with that condition, but note that the action performed is not on the entire contents of a document 112I and instead limited to text that has been extracted from a specific layout structure found to have satisfied the condition of the rule.

On completion of operation 316 (FIG. 3B) on a current document, the results are stored as per act 317 e.g. as collections 135B, 135J and 135M which hold extracted text and/or as statistics 136B, 136J and 136M. In act 317, document analyzer 134 may optionally store the same information also in RDBMS tables 138B, 138J and 138M (used to hold extracted text in collections 135B, 135J and 135M), and a shared RDBMS table 138Z (used to hold statistics 136B, 136J and 136M in a single table). On completion of act 317, document analyzer 134 returns to act 313 (described above), unless there are no more documents to be analyzed in which case execution of document analyzer 134 ends.

Figure 3C:
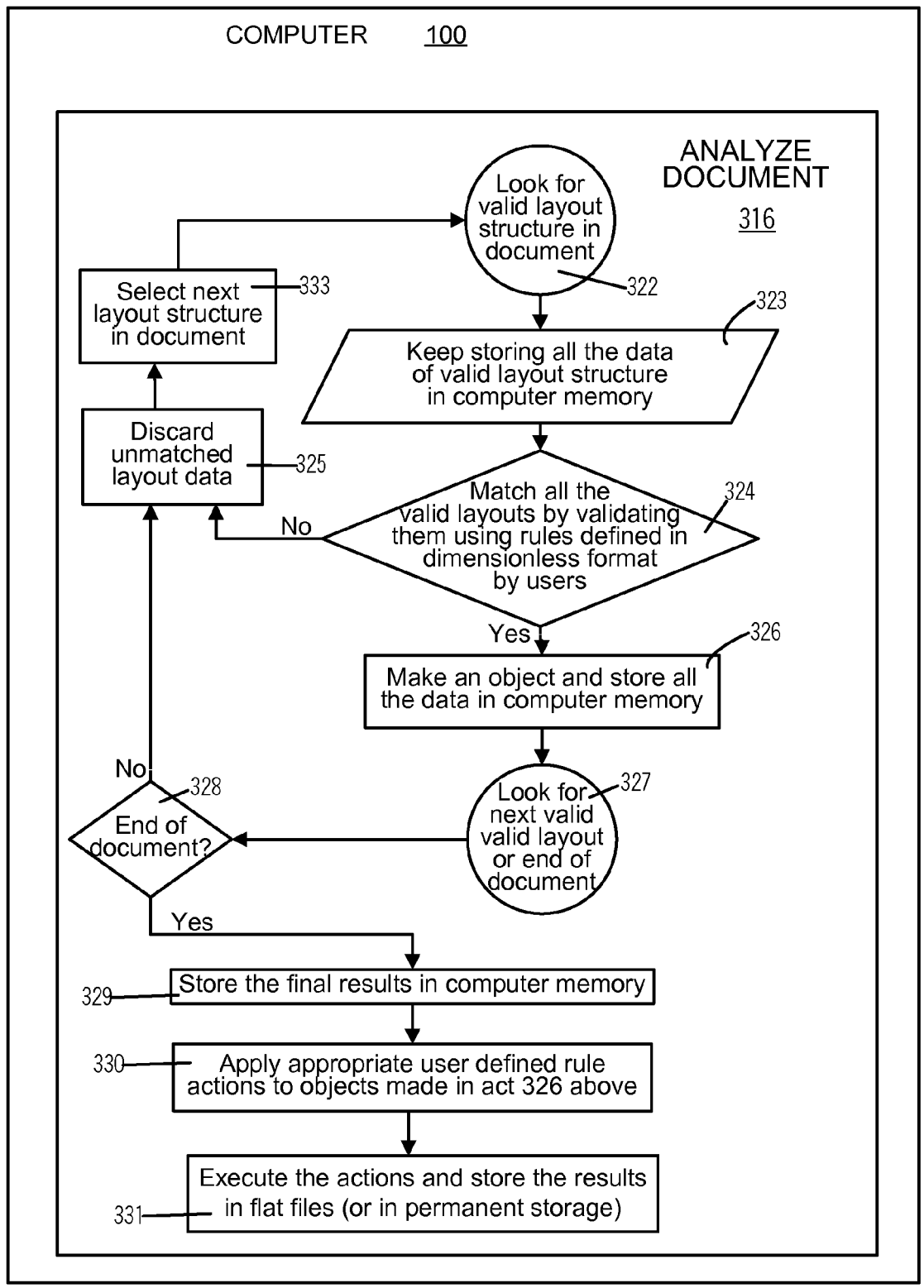
FIG. 3C illustrates, in a flow chart, an operation 316 performed in the method of FIG. 3B by a server computer 100 of FIG. 1B in some embodiments of the invention.

In some aspects of the invention, operation 316 described in the paragraph above is implemented as illustrated in FIG. 3C, as follows. In an act 322 of operation 316, document analyzer 134 starts analyzing the current document (which, as noted above in reference to act 315, is in a dimensionless format), by looking for a layout structure in the document that is valid. Thereafter, in act 323, all the data in the valid layout structure is stored in computer memory (e.g. in random access memory or RAM). Next, in act 324, document analyzer 134 matches all valid layouts by validating them using rules defined in dimensionless format by users (e.g. in rules file 133X as discussed above). If the answer in act 324 is no, document analyzer 134 goes to act 325 else goes to act 326. In act 325, document analyzer 134 discards unmatched layout data, and goes to act 333 to select for validation, a next layout structure in the current document.

From act 333, document analyzer 134 returns to act 322 described above. In act 326, document analyzer 134 makes an object for the valid layout structure and stores in computer memory all the data from the valid layout structure. Then, document analyzer 134 goes to act 327 to look for a next valid layout or end of document. Next, document analyzer 134 goes to act 328 to check if an end of document has been found and if so goes to act 329 else goes to act 325 (described above). In act 329, document analyzer 134 stores final results in computer memory. Then document analyzer 134 goes to act 330 and applies one or more user defined rule action(s) to the objects that were made in act 326 (described above). Next, document analyzer 134 goes to act 331 and executes the actions and stores the results in flat files (or in permanent storage).

In some embodiments in accordance with the invention, documents 112I-112N (see group 115X in FIG. 1B) that are to be analyzed are transferred to computer 100 from a document repository identified in field 351 (see FIG. 3D) on a file server identified in field 352 (see FIG. 3D), as discussed next. Specifically, FTP:—File Transfer Protocol is used as a generic protocol for transferring files across the computers/networks as described above in reference to act 301 in FIG. 3A and acts 311, 312 in FIG. 3B. FTP Server address in field 351 and the FTP root directory in field 352 are provided from a user interface in the form of a home page (JSP Page) of document analyzer 134 along with rest of the details. In FIG. 3D, the field for FTP address in field 351 is labeled "File Server" and root directory in field 352 is labeled "Folder Name or Breadcrumb". A third field 353 labeled "Document Name" is used if user wants to process only one document. If field 353 is empty, the whole directory in field 352 is processed. The field 354 labeled "Process Sub Directory" is a flag selected with the value "YES" or "NO". If it is "YES", all subdirectories of the user-specified directory are processed. If it is "NO", only the user-specified directory given in "Folder Name or Breadcrumb" is processed. User populates other such fields as shown in FIG. 3D and clicks on "Submit" button 359 to start execution of document analyzer 134.

Note that document analyzer 134 uses a rules file which is identified based on user input in fields 356 and 357 of the home page illustrated in FIG. 3D. In some embodiments, there are multiple rules files that are selected during document processing by document analyzer 134 using a naming convention as follows. One rules file is named ParsingRule_<Document Information Table>_<Document Template Version Field Name>.xml for example the file name ParsingRule_Document_Metadata_APM_Template_Version.xml. Another rules file is named ParsingRule_<Document Information Table>_<Document Type>_<Document Template Version Value>.xml, for example the file name ParsingRule_Document_Metadata_PUC_1.0.xml. Yet another rules file is named ParsingRule_<Release Version for Application>_<Rule Type>_<Document Template Version Value>.xml, for example the file name Parsing Rule_2.0_PUC_EXTRACT_ALL_1.0.xml.

A first rule file with the naming convention ParsingRule_<Document Information Table>_<Document Template Version Field Name>.xml is now described. The just-described rule file name is the combination of name of "Document Information Table" defined in the document's cover page and the name of "Document Template Version Field Name" defined in the "Document Information Table". Document analyzer 134 uses the file "ParsingRule_Document_Metadata_APM_Template_Version.xml" where "Document_Metadata" is the "Document Information Table" defined in the document's cover page and "APM_Template_Version" is the name of "Document Template Version Field Name" defined in "Document_Metadata". Purpose:—The purpose of this file is to define the name of the field of "Document Information Table" that holds the value of this template's version. In the context of document analyzer 134, the field name is "APM Template Version"

A second rule file with the naming convention ParsingRule_<Document Information Table>_<Document Type>_<Document Template Version Value>.xml is now described. Naming Convention:—This above rule file name is the combination of "Document Information Table" defined in the document's cover page, "Document Type" selected by user on the home page (FIG. 3D) in the field "Document Type" and "Document Template Version Value" defined in "Document Information Table" on the cover page. Document analyzer 134 uses the file "ParsingRule_Document_Metadata_PUC_1.0.xml" where "Document Metadata" is the "Document Information Table" defined in the document's cover page, "PUC" is the value selected by user in the "Document Type" dropdown on the home page and "1.0" is the value that document analyzer 134 gets after processing the rule file defined in this paragraph. Purpose:—The purpose of this file is to define the key column of "Document Information Table" that holds the value of the application release value for a particular document type. The "Document Information Table" here is "Document Metadata" and document type is "PUC". "1.0" in the rule name is fetched after processing the rule file defined in the previous paragraph above in reference to the first rules file. The extracted value will further be used to define the name of the final rule file as explained in the next paragraph.

A final rules file with the naming convention ParsingRule_<Release Version for Application>_<Rule Type>_<Document Template Version Value>.xml is now described. Naming Convention:—The above rule file is the combination of "Release Version for Application" as extracted in the previous paragraph "Rule Type" as selected by user on the home page (FIG. 3D) in the field "Action" and "Document Template Version Value" as extracted in step #2. Document analyzer 134 uses the file ParsingRule_2.0_PUC_EXTRACT_ALL_1.0.xml where "2.0" is extracted as described above in reference to the first rules file, "PUC_EXTRACT_ALL" is selected by user and "1.0" is extracted as described above in reference to the second rules file. Purpose:—The purpose of this file is to define all the rules that are to be applied on the document's content. The definition is:—Get me all the EXTRACTION rules for PUC where Application Release is 2.0 and the template version is 1. After this step, the final rule file is selected and document analyzer 134 is ready to get the rules defined in the rule file in the current paragraph. Document analyzer 134 gets the rule by processing this rule using DOM Parser (API to get an xml data) as follows.

In some embodiments, rules are written in XML files 133X of the type shown in FIGS. 2E, 2F and 2H. To make these rules available in document analyzer 134, all the rules are read from these XML files and loaded into POJOs i.e. plain old java objects. POJOs are used by document analyzer 134 to apply rules whenever required. DOM parsing is used by document analyzer 134 to read the rule files. This is a document object model and gives handle to the XML file. All the Section rules are read in Section POJO and Table rules are read in Table POJOs. Collectively, all the section rules and all the table rules are represented by a single Java object. Document analyzer 134 crawling through the object returns the individual objects that represent an individual rule. Following are the attributes that a DOM object has:—1. NodeList:—This attribute holds the list of "PARSING-RULE" attribute. Iterating through it will give the individual rule. 2. Element:—Every rule is represented by an Element object in the NodeList. Based on the above two objects, all the Elements are processed by document analyzer 134 and individual Section, Table rules POJOs are populated.

In certain embodiments, document analyzer 134 is a client-server application, therefore after clicking "Submit" button in FIG. 3D, the request goes from the user's computer 184 to the server computer 100 to invoke execution of document analyzer 134. The "FTP Server address", "Folder Name or Breadcrumb", "Document Name" and "Process Sub-Directories", as entered by user, are picked up by document analyzer 134 from the request attributes. Document analyzer 134 uses credentials i.e. user name and password, picked up from the properties file 139 in order to obtain documents identified in the request, as follows. As noted above, in some embodiments property file 139 is a platform independent flat, permanent storage file that holds the keys and their corresponding values. The user name and password values can be changed anytime in property file 139 without doing an actual code change. This makes FTP connectivity more flexible.

Using the File Server address received in field 351, of the home page of document analyzer 134, and the credentials received from property file 139, a connection is made to the FTP server. The default directory after the connection is the combination of "Folder Name or Breadcrumb." Before FTPing the documents of interest a directory list is made. Out of this list, every directory is picked up and relevant documents are FTPed. Based on "Document Name" and "Process Sub-Directories" the processing is kicked off. If user has entered the "Document Name", the value of "Process Sub-Directories" becomes irrelevant as user wants to process an individual document. If user has not entered the "Document Name" and "Process Sub-Directories" value is "NO", only the current directory will be processed. If user has not entered the "Document Name" and "Process Sub-Directories" value is "YES", then a recursive operation is performed. In the recursive operation, the immediate sub-directories and their subdirectories are processed.

After this recursive step a list is made as follows. The list has information about the directories from which the documents are FTPed. Now document analyzer 134 has the list, and therefore document analyzer 134 now crawls through it and starts FTPing the documents that have certain previously defined relevant file names and extensions and the user-selected "Document Type". As of now, the extensions supported are ".doc", ".rtf" and ".docx". The document types supported in some embodiments are FDD for functional design document, UM for user manuals, and RS for requirements specifications. Document analyzer 134 can be re-configured to support as many documents as desired by appropriate changes in the property file 139. Specifically, a list of values for "Document Type" drop down list box in field 356 of FIG. 3D is picked from properties file. A sample entry in property file 139 is: DOC_TYPES=FDD~FDD: Functional Design Document. In the above sample entry "FDD: Functional Design Document" is visible to the user in field 356 and "FDD" is used by document analyzer 134 internally. These two values are separated by a delimiter "~" in property file 139 when defined as property as mentioned above.

Document analyzer 134 starts FTPing documents of interest as explained above. These documents are stored in a directory of a hard disk where the document analyzer 134 is installed in computer 100. A specific placeholder for these documents is also defined in the properties file 139. Therefore, all the documents with relevant extensions and document types are FTPed by document analyzer 134. Thereafter, document analyzer 134 disconnects from the FTP server and frees up all the resources.

After FTPing all the documents from user-specified directory in a user-specified file server, to an FTP directory on a computer 100 where document analyzer 134 is running, a next step for document analyzer 134 (as described above in reference to acts 302 and 303 in FIG. 3A and acts 313 and 314 in FIG. 3B) is to transfer all the documents with extension ".rtf" from FTP directory on computer 100 to a document processing directory and covert all the documents with extension ".doc" and ".docx" to ".rtf". To find the name of FTPed document's directory, document analyzer 134 reads a value of a key "BATCH_MS_WORD_DOC_DIR" from properties file 139. The value of document's processing directory is also defined in the property file 139, with the key "BATCH_RTF_DOC_DIR". After reading these values, following steps are performed by document analyzer 134 for doc to rtf conversion and transfer of resulting files. Document analyzer 134 goes to the directory defined in "BATCH_MS_WORD_DOC_DIR" and reads the document's extension. If the extension is ".rtf", no need for conversion, document analyzer 134 just transfers the document from current directory to processing directory i.e. as defined in "BATCH_RTF_DOC_DIR". The transfer is done using a batch file. The batch file directory and its name are defined in the property file 139, and a key to find this value is "MOVE_BATCH_FILE_NAME". Document analyzer 134 runs this batch file and the files is transferred.

If the extension is ".doc" or ".docx", document analyzer 134 invokes a MACRO (software instructions) as follows. To convert a document with extension ".doc" or ".docx" to ".rtf", document analyzer 134 uses macros. Macros are small programs written in Visual Basic. The macro for document analyzer 134 is defined for ms-word, to perform the following jobs: open the document, and remove all the images and shapes (document analyzer 134 does not process images). Sample code for image deletion in the macro used by document analyzer 134 is as follows:

```
For Each oShp In ActiveDocument.Shapes
    oShp.Delete
Next
For Each olShp In ActiveDocument.InlineShapes
    olShp.Delete
Next
```

Then, document analyzer 134 saves the document as ".rtf" to a temporary directory. After the above steps, a document is converted to an RTF and stored in a temporary place. Next, document analyzer 134 invokes the batch file that transfers the document from the temporary location to the processing directory. If there is any document that cannot be converted to rtf an error a logged which will finally be displayed to the user. At this stage, document analyzer 134 has all the documents converted to RTFs and stored in the processing directory.

A next step for document analyzer 134 (as described above in reference to act 304 in FIG. 3A and act 315 in FIG. 3B) is to convert the MS-RTF documents to platform independent and position independent format, with style information in XML structures called XSL (EXtensible Stylesheet Language). The XSL files can be processed by Java using any open source or proprietary APIs. Document analyzer 134 performs RTF to XSL conversion for every document to be analyzed as follows. All the RTF documents are stored in the processing directory. As noted above, the directory is defined in a property file with the key "BATCH_RTF_DOC_DIR". At this stage, document analyzer 134 reads an individual document and invokes APIs in software called BI (Business Intelligence) Publisher APIs available from Oracle Corporation. The BI API reads an entire document in RTF format and uses the style information of the document content to generate the XSL file containing the to-be-analyzed document. The directory of the XSL file is defined in the property file 139 with the key "XSL_DIR". After the conversion, document analyzer 134 has an XSL file containing the to-be-analyzed document. Each XSL file is then processed (as per act 305 in FIGS. 3A and 316 and 317 in FIG. 3B) using an event driven stream parser, commonly known as a SAX parser wherein SAX is an abbreviation of "Simple API for XML." More information on SAX parsers is available on the Internet, for example, at http://www.saxproject.org/. One specific illustrative implementation of the SAX parser is as follows.

The SAX parser in document analyzer 134 is an event driven based parsing. An event is triggered as soon as the parsing encounters start of the tag, end of the tag and characters in between start and end of the tags. Following are the XSL-FO tags that are used during parsing by document analyzer 134 (as per FIG. 3C)—

<fo:inline>:—This tag holds any textual data present in the document. For example, a "Features In Scope" section name is identified by document analyzer 134 as being located between start and end of the <fo:inline> tag.

<fo:table>:—This is the table start tag. All the table data i.e. rows and cells are located in between start and end of <fo:table> tag.

<fo:table-body>:—This tag holds all the table headers, rows and cell data.

<fo:table-row>:—This is the start tag for table row. All the table cell data is between start and end tag of <fo:table-row>.

<fo:table-header>:—When a table is made in a document, the table has headers along with table's actual data. Those headers are represented in this tag.

<fo:table-cell>:—This tag holds the data for an individual table cell.

In an illustrative example, a word-processing document includes a table as shown below:

Features in Scope

| Priority |
|----------|
| High     |

For the table shown above, following is the sample representation of tags that are present in an XML document that is being analyzed by the SAX parser in document analyzer 134:—

```
<fo:inline style-name="Heading 1">Features In Scope</fo:inline>
<fo:table>
    <fo:table-body>
        <fo:table-row>
            <fo:table-header>
                <fo:table-cell>
                    < fo:inline >
                        Priority
                    </ fo:inline >
                </fo:table-cell>
            </fo:table-header>
        </fo:table-row>
        <fo:table-row>
            <fo:table-cell>
                < fo:inline >
                    High
                </ fo:inline >
            </fo:table-cell>
        </fo:table-row>
    </fo:table-body>
</fo:table>
```

Apart from the tags of the type shown above, another important information used in parsing is the style name. Style name is associated with every fo:inline start tag. To identify a valid section or a valid table, the tag in the XML document has to match its style with any one of several predefined style names in property file 139. A key for reading style information from property file is "SECTION_TABLES_STYLE_NAMES".

Moreover, in some embodiments, in any document, every section or table is associated with a section number. Document analyzer 134 does not recognize any layout structure such as a section or table if it does not have a section number associated with it. Following is list of information used to complete the SAX parsing:—XSL tags, as mentioned above, Style Name information and Section Numbers. In addition, rules defined in XML files and extracted using DOM Parser are used in SAX parsing.

Following is a process used by document analyzer 134 in SAX Parsing of some embodiments (as per FIG. 3C). Document analyzer 134 uses two types for storage, one is temporary and another is permanent. For temporary storage, Java stacks are used, for permanent one Java List objects are used. Every section is represented by a Section Object, and every table is represented by a table object. Table name is treated as the section name so a section object holds table name. Parsing starts, a start-tag event is fired when parser encounters <fo:inline> tag. Characters are read after the start-tag event and that character data represents the section name. This character set is stored in a Java string. Parsing encounters the end-tag. The characters stored earlier are compared to all the rules along with the style-name, if any of the rules matches, the Section object is instantiated and stored in the temporary storage. For all the subsequent tags the Section object stores all the information. Since table's object is also wrapped in section objects, so all the tables data also goes in the same object. This temporary storage keeps storing all the data till parsing encounters the next section number. When the next section number is encountered, the section object is moved from temporary storage to more permanent storage i.e. from Java stacks to Java Lists. The permanent object finally has all the XSL data in Java objects. Next step for document analyzer 134 is to apply the rules as follows.

After parsing data from the XSL file, all the i.e. Section and Table objects are present in a memory of document analyzer 134 in the form of List objects. Each and every section or table object is iterated through the List and associated with the corresponding Rule object. The final object again, has List of Section and Table objects. But apart from just the data objects, it has the rule object associated with it. Following is a process used for processing the defined rules (as per acts 306 and 307 in FIG. 3A and act 318 in FIG. 3B). Document analyzer 134 initializes the Rules Engine. Rules Engine has the implementation of all the actions required to perform any rule. Next, document analyzer 134 gets the section and table object List from the Result object. For every Section or Table object, document analyzer 134 gets its associated rule. For every rule, document analyzer 134 invokes the rule function implemented in Rules Engine. Next, document analyzer 134 stores the rule data in a CSV (comma separated values) file or in a relational database. Finally, document analyzer 134 logs into memory, exceptions of all the rules that are not associated with any section or table object.

The method of FIG. 1A may be used to program a computer system 1000 of the type illustrated in FIG. 5A which is discussed next. Specifically, computer system 1000 includes a bus 1102 (FIG. 5A) or other communication mechanism for communicating information, and a processor 1105 coupled with bus 1102 for processing information. Computer system 1000 uses (as the above-described memory 130 of FIG. 1B) a main memory 1106, such as a random access memory (RAM) or other dynamic storage device, coupled to bus 1102 for storing information and instructions (e.g. for the method of FIG. 1A) to be executed by processor 1105 (which is used as processor 120 of FIG. 1B).

Main memory 1106 also may be used for storing temporary variables or other intermediate information (e.g. documents 112A . . . 112N shown in FIG. 1B) during execution of instructions to be executed by processor 1105. Computer system 1000 further includes a read only memory (ROM) 1104 or other static storage device coupled to bus 1102 for storing static information and instructions for processor 1105, such as enterprise software 200. A storage device 1110, such as a magnetic disk or optical disk, is provided and coupled to bus 1102 for storing information and instructions.

Computer system 1000 may be coupled via bus 1102 to a display device or video monitor 1112 such as a cathode ray tube (CRT) or a liquid crystal display (LCD), for displaying information to a computer user, e.g. the content parts 231 and 251 may be displayed on display 1112. An input device 1114, including alphanumeric and other keys (e.g. of a keyboard), is coupled to bus 1102 for communicating information to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, document analyzer 134 (also called SDA) is implemented by computer system 1000 in response to processor 1105 executing one or more sequences of one or more instructions that are contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIG. 1A. In alternative embodiments, hard-wired circuitry may be used in place of or in combination with software instructions to implement the invention. Thus, embodiments of the invention are not limited to any specific combination of hardware circuitry and software.

The term "computer-readable non-transitory storage medium" as used herein refers to any non-transitory storage medium that participates in providing instructions to processor 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer system 1000 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 1000 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 1000, are exemplary forms of carrier waves transporting the information.

Computer system 1000 can send messages and receive data, including program code, through the network(s), network link 1120 and communication interface 1115. In the Internet example, a server 1100 might transmit information retrieved from RDBMS database 138 (FIG. 1B) through Internet 1124, ISP 1126, local network 1122 and communication interface 1115. The instructions for performing the operations of FIG. 1A may be executed by processor 1105 as they are received, and/or stored in storage device 1110, or other non-volatile storage for later execution. In this manner, computer system 1000 may additionally or alternatively obtain instructions and any related data in the form of a carrier wave.

Figure 5A:
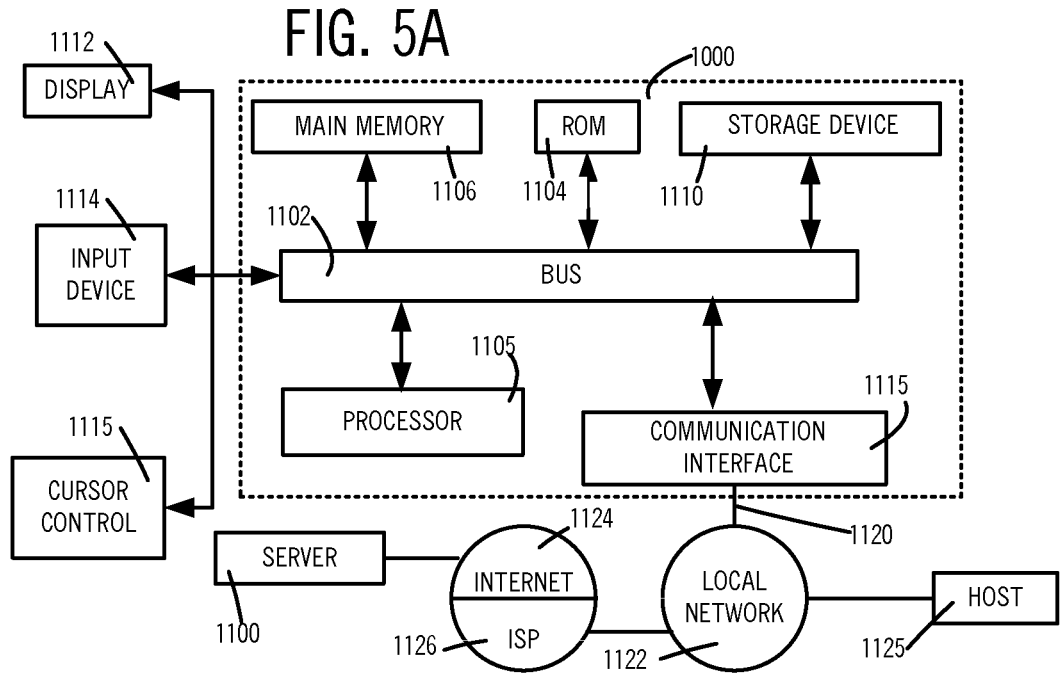
FIGS. 5A and 5B illustrate, in block diagrams, hardware and software portions of a computer that performs the method illustrated in FIG. 3A.
Figure 5B:
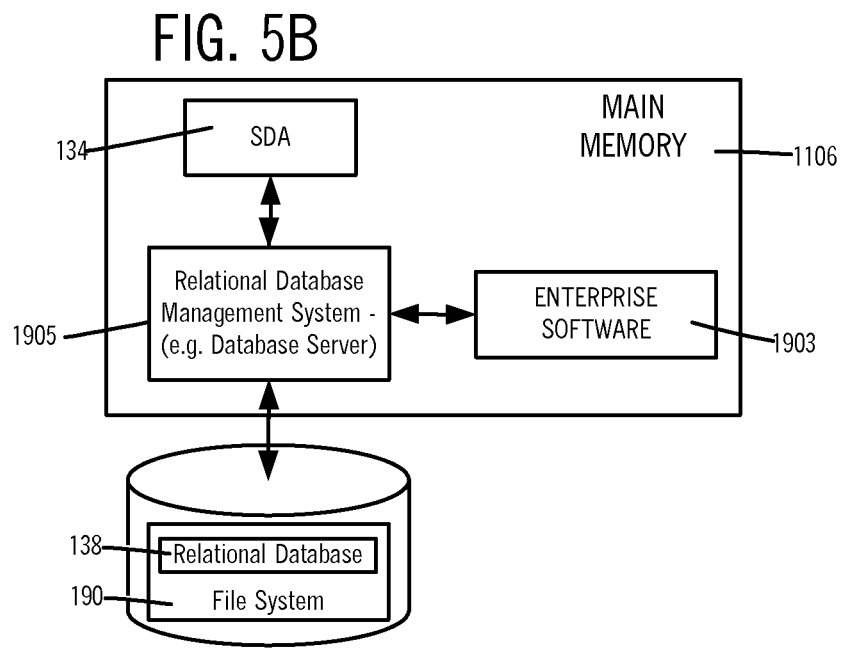

Note that FIG. 5A is a very low-level representation of many hardware components of a computer system. Several embodiments have one or more additional software components in main memory 1106 as shown in FIG. 5B. Specifically, in such embodiments, computer system 1000 of FIG. 5A implements a relational database management system 1905 of the type illustrated in FIG. 5B. Relational database management system 1905 may manage a distributed database system that includes multiple databases, each database 138 being stored on different storage mechanisms.

In some embodiments, the multiple databases are made to appear to SDA 134 as a single database. In such embodiments, an application 1903 can access and modify the data in a database 138 via RDBMS 1905 that accepts queries in conformance with a relational database language, the most common of which is the Structured Query Language (SQL). The commands are used by application 1903 of some embodiments to store, modify and retrieve data about structured documents in the form of rows in a RDBMS table in database 138. Relational database management system 1905 further includes output logic that makes the data in database 138 available to a user via a graphical user interface that generates a display on a video monitor 1112. In one example, the output logic provides results via a web-based user interface that depicts information related to layout structures in documents. Additionally and/or alternatively, a database-centric screen is responsive to a command in a command-line interface and displays on a video monitor text information on layout structures.

Four examples of rules that are processed by a document analyzer 134 in some embodiments of the invention are shown in FIGS. 6A-6D, as follows. FIG. 6A illustrates a rule at the level of a table that is triggered on encountering (in a document being analyzed), a table that is oriented horizontally and has the user-specified name "Business Rules", to fetches the words of text from all cells, having the names "Business Rule ID" and "Description." FIG. 6B illustrates another rule at the level of rows in a table that is triggered on encountering a table that is oriented horizontally and has the name "Solution Components List."

FIG. 6C illustrates yet another rule at the level of cells in a table that is triggered on encountering a table that is complex and has a vertical sub-table embedded therein. Specifically, the rule in FIG. 6C is applied on the table's cell level and this rule causes document analyzer 134 to perform the action to "Count Table Cell With Default Text" on encountering a table with the table name 'Features In Scope', and having a cell with the name 'Priority'. The cell name and cell data are provided to analyzer 134 in the corresponding tags.

FIG. 6D illustrates still another rule that is triggered by a table of a user-specified name being present within a section of another user-specified name. Specifically, the rule of FIG. 6D causes document analyzer 134 to perform the action to "Count Table Rows" on encountering a table with the table name "Requirement For EBS" when the table has a parent section with the name "Features In Scope".

Note that the cell names described above in reference to FIGS. 6A-6D are examples of names that are arranged relative to one another in a word-processing table in a predetermined arrangement e.g. two or more cell names may be arranged horizontally relative to one another or two or more cell names may be arranged vertically relative to one another, depending on the orientation of the word-processing table. Moreover, as noted above, a complex table may include both kinds of orientations, e.g. two or more cell names arranged horizontally and two or more cell names may be arranged vertically.

In several embodiments, these cell names are also received as input from the user, e.g. in a template file, or in a rules files, which input is in addition to user input identifying the table names (and hence the cell names are also called "additional names"). Accordingly, in such examples, an action specified by the user is performed by document analyzer 134 only when a table name in a rule matches and additionally when a cell name in that rule also matches, corresponding names in a layout structure of a word-processing document.

Similarly, in some embodiments, as described above in reference to FIG. 2G, a layout structure is a word-processing section (called "parent section") that itself includes multiple subsections and additional names are arranged indented relative to one another to form a hierarchy (when displayed on one or more pages). Note that a section is identified in some embodiments of the invention based on a style that is specified by the user, e.g. the style-name "Heading 1" although the tag itself does not identify the section "fo:inline." In some aspects of the invention, document analyzer 134 is programmed to recognize a section only if such a tag is preceded by a number in the text of the document also having the same style, i.e. a section number as follows:

<fo:inline style-name="Heading 1">1.1</fo:inline>
<fo:inline style-name="Heading 1">In Scope Requirements</fo:inline>
<fo:inline>Text for the section, In Scope Requirements</fo:inline>

Note that after the above-described XML is recognized by document analyzer 134, it is used to recognize subsections therein, e.g. by use of a rule illustrated in FIG. 2H. In one such rule (see FIG. 6D), the user provides input indicative of at least a portion of an additional name among the additional names in the hierarchy. Accordingly, in such examples, an action specified by the user is performed by document analyzer 134 only when a table name in a rule matches, and additionally when a section name (of a parent section) in that rule also matches, corresponding names in a layout structure of a word-processing document.

Numerous modifications and adaptations of the embodiments described herein will become apparent to the skilled artisan in view of this disclosure. Numerous modifications and adaptations of the embodiments described herein are encompassed by the scope of the invention.

What is claimed is:

1. One or more non-transitory computer-readable storage media comprising a plurality of instructions, the plurality of instructions comprising:
   instructions to receive first user input indicative of a user-specified directory in a user-specified file server storing a set of documents each of which is to be checked for a table that is identified by a specific table name, the table comprising cells arranged in a tabular form, the specific table name being located in a predetermined sequence relative to the table in each document among multiple documents in the set;
   wherein the multiple documents are created by copying a common template, and by overwriting sample text or blanks in the table identified by the specific table name in the multiple documents with user supplied text;
   wherein the multiple documents are stored in a binary format proprietary to a specific word-processor in one or more non-transitory computer-readable storage media in the user-specified directory in the user-specified file server indicated by the first user input;
   instructions to receive second user input indicative of at least a portion of the specific table name;
   instructions to receive third user input selected from among multiple predetermined actions and identifying a specific action to be performed when the second user input is found to match the specific table name identifying the table, in any document in the set;
   instructions to convert each document in the set of documents from the binary format into an interoperable format used by different word-processors across different platforms;
   instructions to convert said each document from the interoperable format into a markup language;
   instructions to automatically search the set of documents using at least tags in the markup language to find the table identified by the specific table name matching the second user input;
   instructions to perform at least the specific action identified by the third user input, by use of at least the user supplied text comprised in the table identified by execution of the instructions to automatically search based on the second user input, at least once for each document in the multiple documents; and
   instructions to incrementally store in a computer memory, at least the user supplied text or statistics thereof compiled across multiple documents into a collection, as a result of execution of the instructions to perform.

2. The one or more non-transitory computer-readable storage media of claim 1 wherein:
   the second user input does not identify a position of the table in a page; and
   the plurality of instructions are independent of said position.

3. The one or more non-transitory computer-readable storage media of claim 1 wherein:
   the plurality of instructions further comprise instructions to receive fourth user input indicative of at least a portion of a header of a column or a row in the table; and
   wherein said specific action is to be performed by said plurality of instructions when the fourth user input is found to match the header of the column or the row, in addition to said matching of the second user input to said specific table name identifying the table.

4. The one or more non-transitory computer-readable storage media of claim 3 wherein:
   at least two headers including said header are arranged horizontally relative to one another, to define two columns in the table.

5. The one or more non-transitory computer-readable storage media of claim 3 wherein:
   at least two headers including said header are arranged vertically relative to one another, to define two rows in the table.

6. The one or more non-transitory computer-readable storage media of claim 1 wherein:
   the table is comprised in a section and the section has associated therewith a section name;
   the plurality of instructions further comprise instructions to receive fourth user input indicative of at least a portion of the section name; and
   wherein the specific action is to be performed by the plurality of instructions when the fourth user input is found to match the section name, in addition to said matching of the second user input to the specific table name identifying the table.

7. The one or more non-transitory computer-readable storage media of claim 1 wherein the plurality of instructions further comprise:
   instructions to display a plurality of specific table names; and
   wherein the instructions to receive the second user input are arranged among the plurality of instructions to be executed after execution of the instructions to display the plurality of specific table names.

8. The one or more non-transitory computer-readable storage media of claim 1 wherein:
   the table is stored in a binary format proprietary to a specific word-processing software that comprises a spell-checking feature, a grammar checking feature, a word counting feature, and a table insertion feature;
   the set of documents indicated by the first user input are created by the specific word-processing software; and
   the table insertion feature is used to format words of the user supplied text in the table identified by a specific table name.

9. The one or more non-transitory computer-readable storage media of claim 1 wherein:
   the specific action comprises collecting the statistics from the user supplied text comprised in the table identified by execution of the instructions to automatically search.

10. The one or more non-transitory computer-readable storage media of claim 1 wherein:
    the specific action comprises counting a number of rows that are blank or have the sample text, in the table identified by execution of the instructions to automatically search.

11. The one or more non-transitory computer-readable storage media of claim 1 wherein:

the specific action comprises searching of the user supplied text comprised in the table identified by execution of the instructions to automatically search.

12. The one or more non-transitory computer-readable storage media of claim 1 wherein:
the specific action comprises checking if a user-specified condition is met by the user supplied text comprised in the table identified by execution of the instructions to automatically search.

13. The one or more non-transitory computer-readable storage media of claim 1 further comprising:
instructions, to be executed prior to execution of the instructions to receive the third user input, to transmit on a link at least names of the multiple predetermined actions to be displayed on a screen.

14. A method of analyzing documents by using one or more computers, the method comprising:
receiving first user input indicative of a user-specified directory in a user-specified file server storing a set of documents each of which is to be checked for a table that is identified by a specific table name, the table comprising cells arranged in a tabular form, the specific table name being located in a predetermined sequence relative to the table in each document among multiple documents in the set;
wherein the multiple documents are created by copying a common template, and by overwriting sample text or blanks in the table identified by the specific table name in the multiple documents with user supplied text;
wherein the multiple documents are stored in a binary format proprietary to a specific word-processor in one or more non-transitory computer-readable storage media in the user-specified directory in the user-specified file server indicated by the first user input;
receiving second user input indicative of at least the portion of the specific table name;
receiving third user input selected from among multiple predetermined actions and identifying a specific action to be performed when the second user input is found to match the specific table name identifying the table, in any document in the set;
converting each document in the set of documents from the binary format into an interoperable format used by different word-processors across different platforms;
converting said each document from the interoperable format into a markup language;
the one or more computers automatically searching the set of documents using at least tags in the markup language to find the table associated with the specific table name matching the second user input;
the one or more computers performing at least the specific action identified by the third user input by use of at least the user supplied text comprised in the table identified by the automatically searching based on the second user input, at least once for each document in the multiple documents; and
the one or more computers incrementally storing in a computer memory, at least the user supplied text or statistics thereof compiled across multiple documents into a collection, as a result of performance of at least the specific action.

15. The method of claim 14 further comprising:
receiving fourth user input indicative of at least a portion of a header of a column or a row in the table; and
wherein the specific action is to be performed when the fourth user input is found to match the header of the column or the row, in addition to said matching of the second user input to the specific table name identifying the table.

16. The method of claim 14 wherein:
the specific action comprises counting a number of rows that are blank or have the sample text, in the table identified by automatically searching the set of documents.

17. The method of claim 14 wherein:
the specific action comprises counting a number of rows that are blank or have the sample text, in the table identified by the automatically searching.

18. The method of claim 14 wherein:
the specific action comprises searching of the user supplied text comprised in the table identified by the automatically searching.

19. The method of claim 14 wherein:
the specific action comprises checking if a user-specified condition is met by the user supplied text comprised in the table identified by the automatically searching.

20. An apparatus for interfacing with a user, the apparatus comprising a processor and a memory coupled to the processor, wherein the processor is configured to execute a plurality of instructions in the memory that cause the processor to:
receive first user input indicative of a user-specified directory in a user-specified file server storing a set of documents each of which is to be checked for a table that is identified by a specific table name, the table comprising cells arranged in a tabular form, the specific table name being located in a predetermined sequence relative to the table in each document among multiple documents in the set;
wherein the multiple documents are created by copying a common template, and by overwriting sample text or blanks in the table identified by the specific table name in the multiple documents with user supplied text;
wherein the multiple documents are stored in a binary format proprietary to a specific word-processor in one or more non-transitory computer-readable storage media in the user-specified directory in the user-specified file server indicated by the first user input;
receive second user input indicative of at least the portion of the specific table name,
receive third user input selected from among multiple predetermined actions and identifying a specific action to be performed when the second user input is found to match the specific table name identifying the table, in any document in the set;
convert each document in the set of documents from the binary format into an interoperable format used by different word-processors across different platforms;
convert said each document from the interoperable format into a markup language;
automatically search the set of documents using at least tags in the markup language to find the table associated with the specific table name matching the second user input;
perform at least the specific action identified by the third user input by use of at least the user supplied text comprised in the table identified by execution of the instructions that cause the processor to automatically search based on the second user input, at least once for each document in the multiple documents; and
incrementally store in a computer memory, at least the user supplied text or statistics thereof compiled across multiple documents into a collection obtained by performance of at least the specific action.

* * * * *

UNITED STATES PATENT AND TRADEMARK OFFICE
CERTIFICATE OF CORRECTION

PATENT NO. : 9,690,770 B2
APPLICATION NO. : 13/149831
DATED : June 27, 2017
INVENTOR(S) : Desai et al.

It is certified that error appears in the above-identified patent and that said Letters Patent is hereby corrected as shown below:

In the Drawings

On sheet 1 of 26, in FIG. 1A, under Reference Numeral 101B, Line 6, delete "Also" and insert -- also --, therefor.

On sheet 15 of 26, in FIG. 3A, under Reference Numeral 302, Line 1, delete "is" and insert -- Is --, therefor.

On sheet 16 of 26, in FIG. 3B, under Reference Numeral 316, Line 2, delete "parse" and insert -- Parse --, therefor.

On sheet 17 of 26, in FIG. 3C, under Reference Numeral 327, Lines 2-3, delete "valid valid" and insert -- valid --, therefor.

In the Specification

In Column 28, Lines 9-10, delete "Parsing Rule" and insert -- ParsingRule --, therefor.

In Column 28, Line 28, after "Version" insert -- . --.

Signed and Sealed this
Thirteenth Day of February, 2018

Andrei Iancu
*Director of the United States Patent and Trademark Office*